US010668961B2

United States Patent
Erickson

(10) Patent No.: US 10,668,961 B2
(45) Date of Patent: Jun. 2, 2020

(54) FIFTH WHEEL HITCH AND ASSOCIATED SYSTEMS AND METHODS

(71) Applicant: NSD Innovations, LLC, Boone, IA (US)

(72) Inventor: Nicholas Erickson, Boone, IA (US)

(73) Assignee: NSD Innovations, LLC, Boone, IA (US)

( * ) Notice: Subject to any disclaimer, the term of this patent is extended or adjusted under 35 U.S.C. 154(b) by 0 days.

(21) Appl. No.: 16/113,553

(22) Filed: Aug. 27, 2018

(65) Prior Publication Data

US 2018/0362104 A1     Dec. 20, 2018

Related U.S. Application Data

(63) Continuation of application No. 14/966,820, filed on Dec. 11, 2015, now Pat. No. 10,059,387.

(60) Provisional application No. 62/090,391, filed on Dec. 11, 2014.

(51) Int. Cl.
    *B62D 53/08*        (2006.01)

(52) U.S. Cl.
    CPC .................. *B62D 53/0814* (2013.01)

(58) Field of Classification Search
    CPC ............... B62D 53/08; B62D 53/0814; B62D 53/0807; B62D 53/0885; B62D 53/0821; B62D 53/0835; B62D 53/0828
    USPC ......................... 280/433, 439, 440, 441, 901
    See application file for complete search history.

(56) References Cited

U.S. PATENT DOCUMENTS

| | | | | |
|---|---|---|---|---|
| 2,027,990 A | * | 1/1936 | Lubbers | B62D 53/08 280/440 |
| 2,543,749 A | * | 3/1951 | Walther | B62D 53/08 280/440 |
| 3,241,860 A | | 3/1966 | Janeway | |
| 3,528,683 A | * | 9/1970 | Janeway | B62D 53/0835 280/438.1 |
| 3,633,941 A | * | 1/1972 | Pleier | B62D 53/0842 280/440 |
| 4,475,740 A | | 10/1984 | Strick | |
| 5,868,415 A | * | 2/1999 | Van Vleet | B60D 1/065 280/483 |
| 6,170,850 B1 | | 1/2001 | Works | |
| 6,685,210 B2 | | 2/2004 | Lindenman et al. | |
| 6,726,396 B2 | | 4/2004 | Plett | |
| 7,100,935 B1 | | 9/2006 | Dunbar | |
| 7,264,259 B2 | | 9/2007 | Lindenman et al. | |
| 7,806,424 B2 | | 10/2010 | Burns et al. | |
| 7,878,525 B2 | | 2/2011 | Andersen | |
| 8,414,009 B2 | | 4/2013 | Stanifer et al. | |

(Continued)

FOREIGN PATENT DOCUMENTS

EP      2412549 A1    2/2012

*Primary Examiner* — Anne Marie M Boehler
(74) *Attorney, Agent, or Firm* — Davis, Brown, Koehn, Shors & Roberts, P.C.; Matthew Warner-Blankenship

(57) ABSTRACT

The disclosed apparatus, systems and methods relate to an improved fifth-wheel hitch which features a pivotally-mounted head assembly. The hitch assembly has a rocker assembly which allows for the pivotal movement of the head during mounting. The rocker can be secured in a fixed position during transport. A multi-point jaw assembly is also provided. A rail kit adaptor and gooseneck adaptor are also provided. The assembly is light and engineered for quick and efficient installation and use in the bed of a truck.

18 Claims, 20 Drawing Sheets

(56) References Cited

U.S. PATENT DOCUMENTS

| | | | |
|---|---|---|---|
| 8,430,418 B2* | 4/2013 | McCoy | B60D 1/02 |
| | | | 280/438.1 |
| 8,960,705 B2 | 2/2015 | McCall | |
| 2005/0077702 A1 | 4/2005 | Lindenman et al. | |
| 2011/0025019 A1* | 2/2011 | Schmidt | B62D 29/002 |
| | | | 280/504 |
| 2012/0018979 A1 | 1/2012 | McCoy et al. | |

* cited by examiner

FIFTH WHEEL HITCH AND ASSOCIATED SYSTEMS AND METHODS

CROSS-REFERENCE TO RELATED APPLICATION(S)

This application is a continuation of U.S. application Ser. No. 14/966,820, filed Dec. 11, 2015, which claims priority to U.S. Provisional Application No. 62/090,391 filed Dec. 11, 2014, which are hereby incorporated by reference in their entirety under 35 U.S.C. § 119(e).

TECHNICAL FIELD

The disclosure relates to a hitch assembly for pulling large fifth wheel type travel trailers, including hitches with a moveable hitch head to provide additional clearance when needed for turning tight corners. Moreover, it provides a hitch that can be coupled to a vehicle through a gooseneck hitch or through industry standard fifth wheel rails. The various disclosed embodiments generally relate to a removable, rocking hitch head assembly which minimizes vertical displacement of the hitch head and correspondingly the king pin of a trailer through the use of guide journals and other mechanical improvements.

BACKGROUND

The disclosure relates to an improved fifth-wheel hitch. Fifth wheel hitches for pulling large travel trailers were designed for trucks equipped with a long box which is approximately eight feet long. In recent years, the popularity of short box trucks, such as those with boxes that are six and a half feet or less, have required the use of sliding or movable head hitches, which are designed to provide extra cab to camper clearance when turning. Presently, such hitches, as found in U.S. Pat. No. 6,685,210, generally slide along a pair of tubes or rails that act as guide tracks to control and limit the motion of the hitch. These hitches are generally very large and extremely heavy. This poses a problem for the end user, who frequently uses their truck and box for purposes other than hauling a fifth wheel travel trailer.

Another method of moving the hitch head was suggested in U.S. Pat. No. 7,806,424: utilizing a pivoting style moveable head hitch. This design allows the hitch head to pivot about a central point or multiple points to move the head rearward. While this proves to be a viable method of re-positioning the hitch head, it also introduces a problem. Namely, as the head pivots forward and rearward, it effectively changes height while doing so. This causes the head to travel in an arc. This creates issues for end users when traversing the hitch head between these positions. It requires a substantial pulling force to initiate the movement of the hitch head. After movement has begun and reached the uppermost point of the arc, it becomes very difficult to slow down the momentum generated and the hitch generally crashes down into its rest position. This is undesirable and not safe.

Accordingly, there is a need in the art for an improved fifth-wheel hitch assembly which improves upon the prior art.

BRIEF SUMMARY

Discussed herein are various apparatus, systems and methods relating to a fifth-wheel hitch.

One example includes a fifth wheel hitch trailer hitch assembly, including a base assembly, a rocker assembly including a hitch head, a first support arm, and a second support arm, a first roller guide plate including a first roller guide plate first elongate journal, a second roller guide plate including a second roller guide plate first elongate journal, a first projection, and a second projection, where the rocker head assembly is in rotational communication with the base assembly by way of the first support arm and second support arm such that the first projection is slidable relative to the first roller guide plate first elongate journal and the second projection is slidable relative to the second roller guide plate first elongate journal.

Implementations may include one or more of the following features. The fifth wheel trailer hitch assembly where the base assembly includes a first base assembly leg and a second base assembly leg. The fifth wheel trailer hitch assembly including a first roller guide plate and a second roller guide plate. The fifth wheel trailer hitch assembly where the first roller guide plate includes the first roller guide plate first elongate journal, and a first roller guide plate second elongate journal, and the second roller guide plate includes the second roller guide plate first elongate journal, and a second roller guide plate second elongate journal. The fifth wheel trailer hitch assembly where the first roller guide plate first elongate journal and first roller guide plate second elongate journal are disposed at approximately 90 degrees from one another. The fifth wheel trailer hitch assembly where the rocker assembly further includes a first rocker plate including the first protrusion and a third protrusion, a second rocker plate including the second protrusion and fourth protrusion, a horizontal torsion tube having a first end and second end, the horizontal torsion tube being disposed between the first rocker plate and second rocker plate and the first support arm and second support arm, and a support bar having a first end and second end, the support bar being disposed between the support arms opposite the horizontal torsion tube, such that the head assembly can be mounted on the rocker assembly. The fifth wheel trailer hitch assembly where the first support tube further includes a first support tube upper aeon and a first support tube lower aeon and the second support tube further includes a second support tube upper aeon and a second support tube lower aeon, where the first and second upper aeons and first and second lower aeons are disposed about the first and second ends of the support bar, respectively, and are configured to absorb vibrational forces. The fifth wheel trailer hitch assembly where the first protrusion is in slidable communication with the first roller guide plate first elongate journal, the second protrusion is in slidable communication with the first roller guide plate second elongate journal, the third protrusion is in slidable communication with the second roller guide plate first elongate journal and the fourth protrusion is in slidable communication with the second roller guide plate second elongate journal so as to be configured to allow for the rotation of the rocker assembly relative to the base assembly. The fifth wheel trailer hitch assembly where the rocker assembly further includes a horizontal torsion tube having a first end and second end, the horizontal torsion tube being disposed between the first rocker plate and second rocker plate and the first support arm and second support arm, and a support bar having a first end and second end, the support bar being disposed between the support arms opposite the horizontal torsion tube, such that the head assembly can be mounted on the rocker assembly. The fifth wheel trailer hitch assembly where the first support tube further includes a first support tube upper aeon and a first support tube lower aeon and the second support tube further includes a second support tube upper aeon and a second support tube lower aeon, where the first and second upper aeons and first and second lower aeons are disposed about the first and second ends of the support bar, respectively, and are configured to absorb vibrational forces. The fifth wheel trailer hitch assembly where the first roller guide plate first elongate journal and first roller guide plate second elongate journal are disposed at approximately 90 degrees from one another. The fifth wheel trailer hitch assembly where the first roller guide plate and second roller guide plate are opposing arc roller guide plates. The fifth wheel trailer hitch assembly where the first roller guide plate and second roller guide plate are opposing arc roller guide plates. The fifth wheel trailer hitch assembly further including a jaw mechanism. The fifth wheel trailer hitch assembly where the hitch head is configured to selectively grasp a king pin, the jaw mechanism further including an upper clasping jaw and lower clasping jaw configured to grasp the king pin.

One example includes A fifth wheel hitch trailer hitch assembly, including a base assembly including a first support leg, and a second support leg, a rocker head assembly including a hitch head, a first support arm including upper and lower ends, a second support arm including upper and lower ends, a first rocker plate disposed at the lower end of the first support arm between the first support arm and first support leg and including a first projection and second projection, and a second rocker plate disposed at the lower end of the second support arm between the second support arm and second support leg and including a third projection and fourth projection, a first roller guide plate disposed between the first rocker plate and first support leg and including a first roller guide plate first elongate journal and first roller guide plate second elongate journal, and a second roller guide plate disposed between the second rocker plate and second support leg and including a second roller guide plate first elongate journal and second roller guide plate second elongate journal.

Implementations may include one or more of the following features. The fifth wheel trailer hitch assembly where the first protrusion is in slidable communication with the first roller guide plate first elongate journal, the second protrusion is in slidable communication with the first roller guide plate second elongate journal, the third protrusion is in slidable communication with the second roller guide plate first elongate journal and the fourth protrusion is in slidable communication with the second roller guide plate second elongate journal so as to be configured to allow for the rotation of the rocker assembly relative to the base assembly. The fifth wheel trailer hitch assembly where the rocker assembly further includes a horizontal torsion tube having a first end and second end, the horizontal torsion tube being disposed between the first rocker plate and second rocker plate and the first support arm and second support arm, and a support bar having a first end and second end, the support bar being disposed between the support arms opposite the horizontal torsion tube, such that the head assembly can be mounted on the rocker assembly. The fifth wheel trailer hitch assembly where the first support tube further includes a first support tube upper aeon and a first support tube lower aeon and the second support tube further includes a second support tube upper aeon and a second support tube lower aeon, where the first and second upper aeons and first and second lower aeons are disposed about the first and second ends of the support bar, respectively, and are configured to absorb vibrational forces. The fifth wheel trailer hitch assembly where the first roller guide plate first elongate journal and first roller guide plate second elongate journal are disposed at approximately 90 degrees from one another. The fifth wheel trailer hitch assembly where the first roller guide plate and second roller guide plate are opposing arc roller guide plates. The fifth wheel trailer hitch assembly further including a jaw mechanism. The fifth wheel trailer hitch assembly where the hitch head is configured to selectively grasp a king pin, the jaw mechanism further including an upper clasping jaw and lower clasping jaw configured to grasp the king pin.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1A:
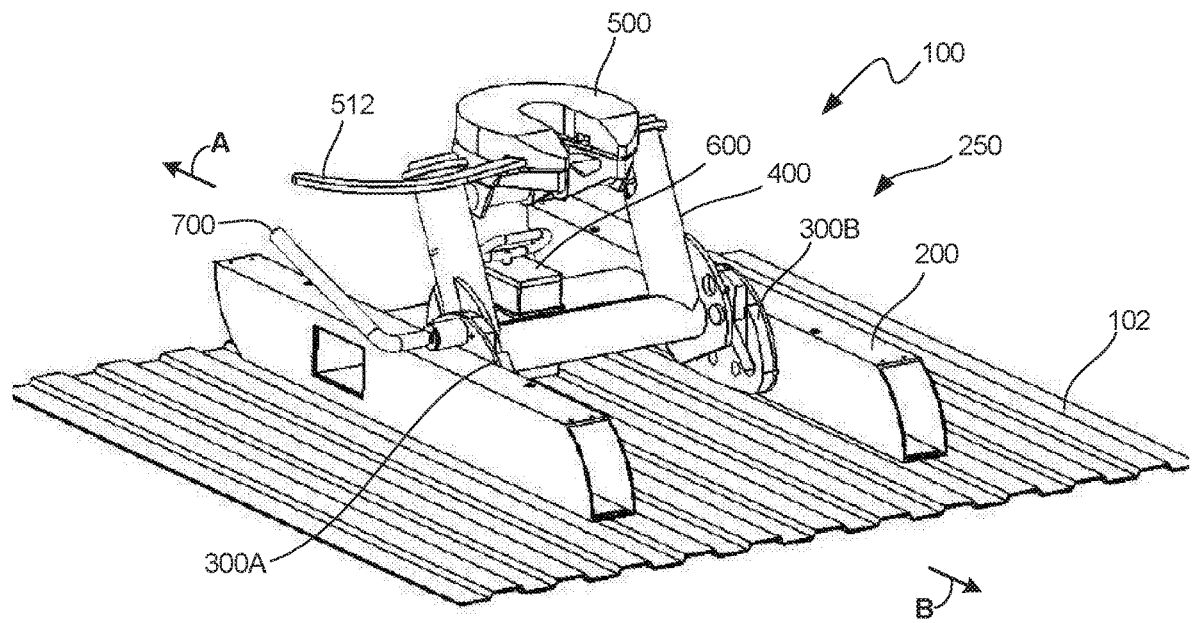
FIG. 1A is a perspective view of the fifth wheel hitch assembly of the hitch, according to one embodiment.

FIGS. 1A-8D depict various aspects and embodiments of the fifth wheel hitch assembly 100, or hitch assembly 100 and associated systems and methods. In the embodiment of FIG. 1A, the hitch assembly 100 is installed within a truck bed 102. In various embodiments, the hitch assembly 100 generally comprises a base assembly 200, roller guide plates 300A, 300B, a rocker assembly 400 and a head assembly 500. The depicted hitch assembly 100 also has a gooseneck coupler 600. In the depicted embodiments, an optional multi-point jaw system 501 is also provided. In various embodiments, the head assembly 500 is configured to be capable of being freely pivoting relative to the base assembly 200 by way of the rocker assembly 400 and roller guide plates 300. In certain implementations, the head assembly 500 and rocker assembly 400 can also be locked into a fixed position relative to the base assembly 200 by way of a lock assembly 700, as is described below. Other embodiments will be apparent from the description and drawings contained herein.

Figure 1B:
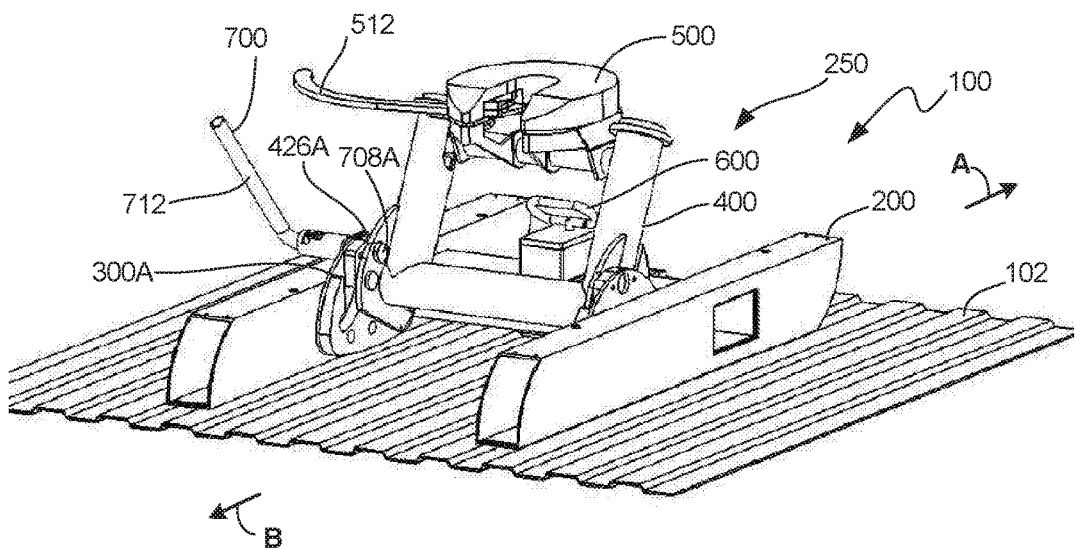
FIG. 1B is an alternate perspective view of the hitch embodiment of FIG. 1A.
Figure 2A:
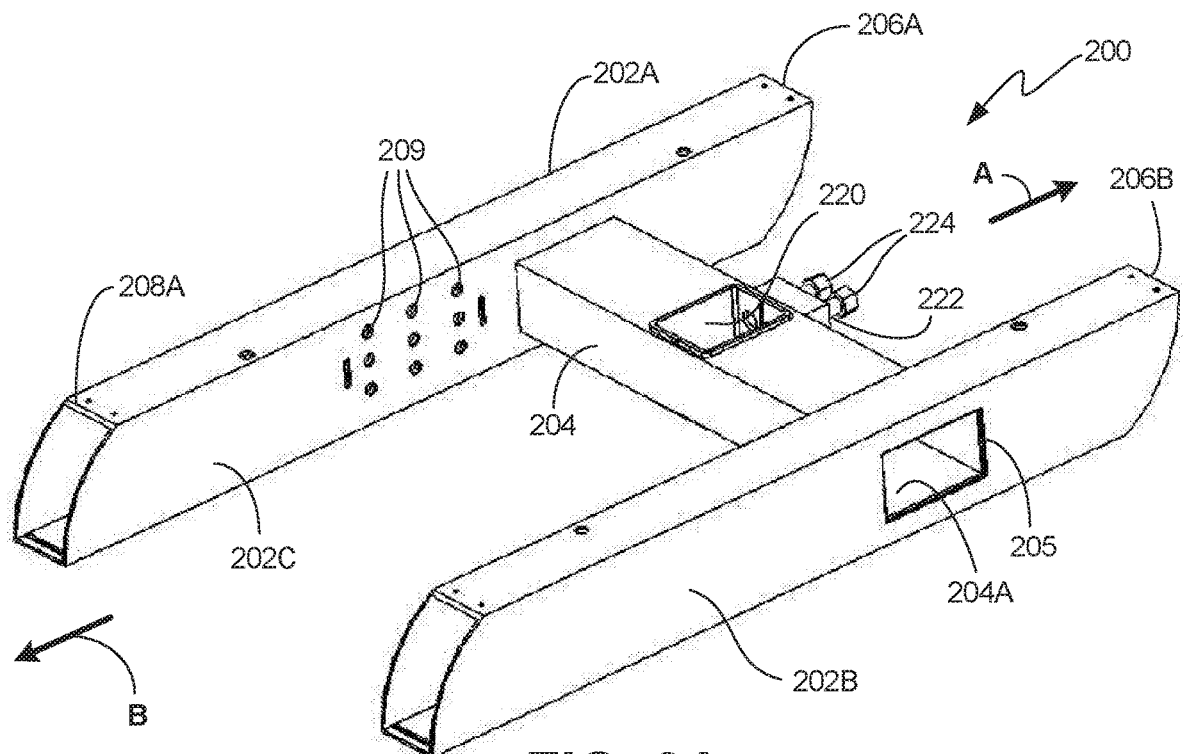
FIG. 2A is a three-quarters perspective view of a base assembly, according to one embodiment.
Figure 2B:
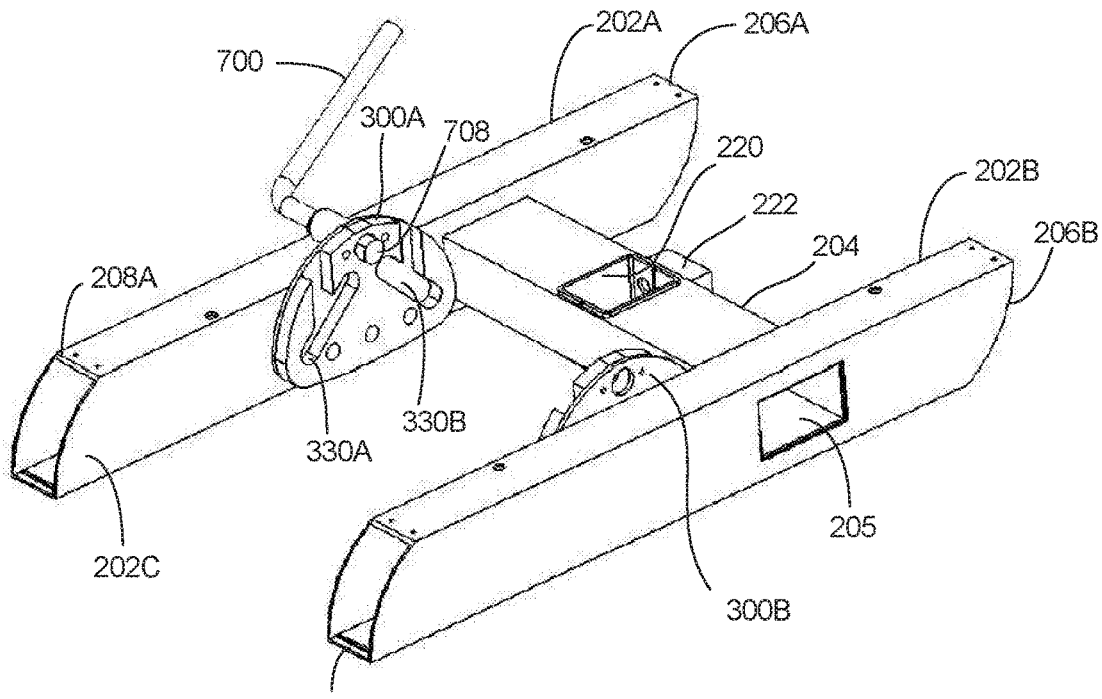
FIG. 2B is a further perspective view of a base assembly fitted with roller guide plates, according to one embodiment.
Figure 2C:
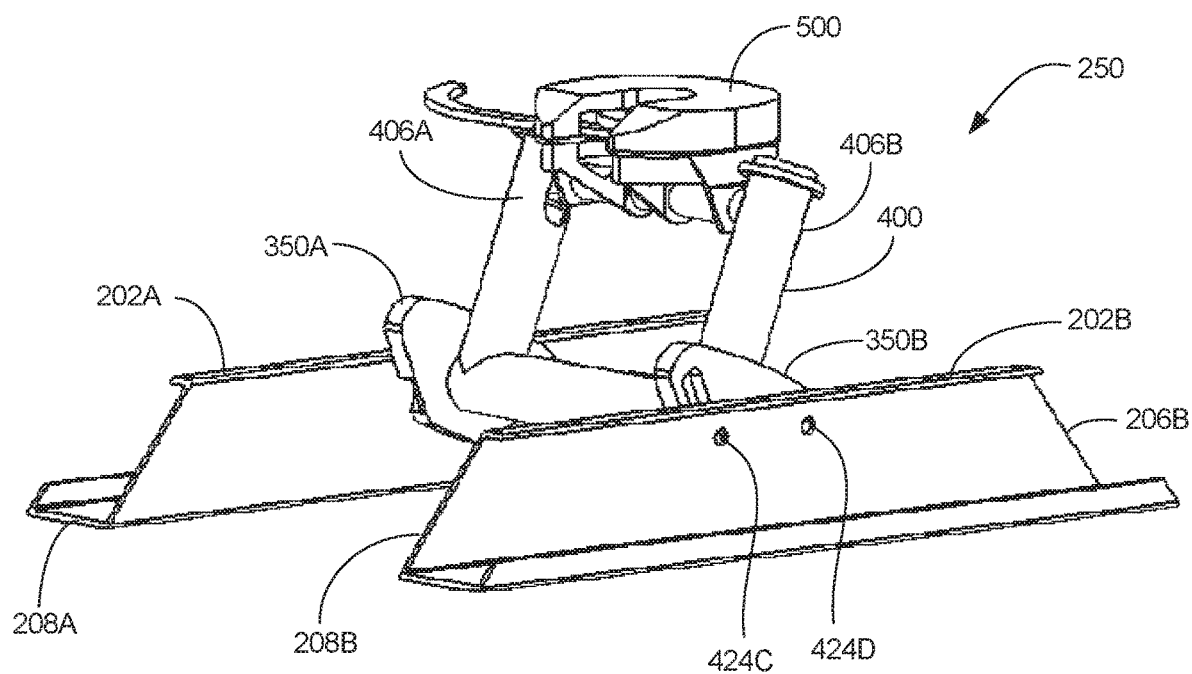
FIG. 2C is a perspective side view of an alternate embodiment of the fifth wheel hitch assembly.
Figure 3A:
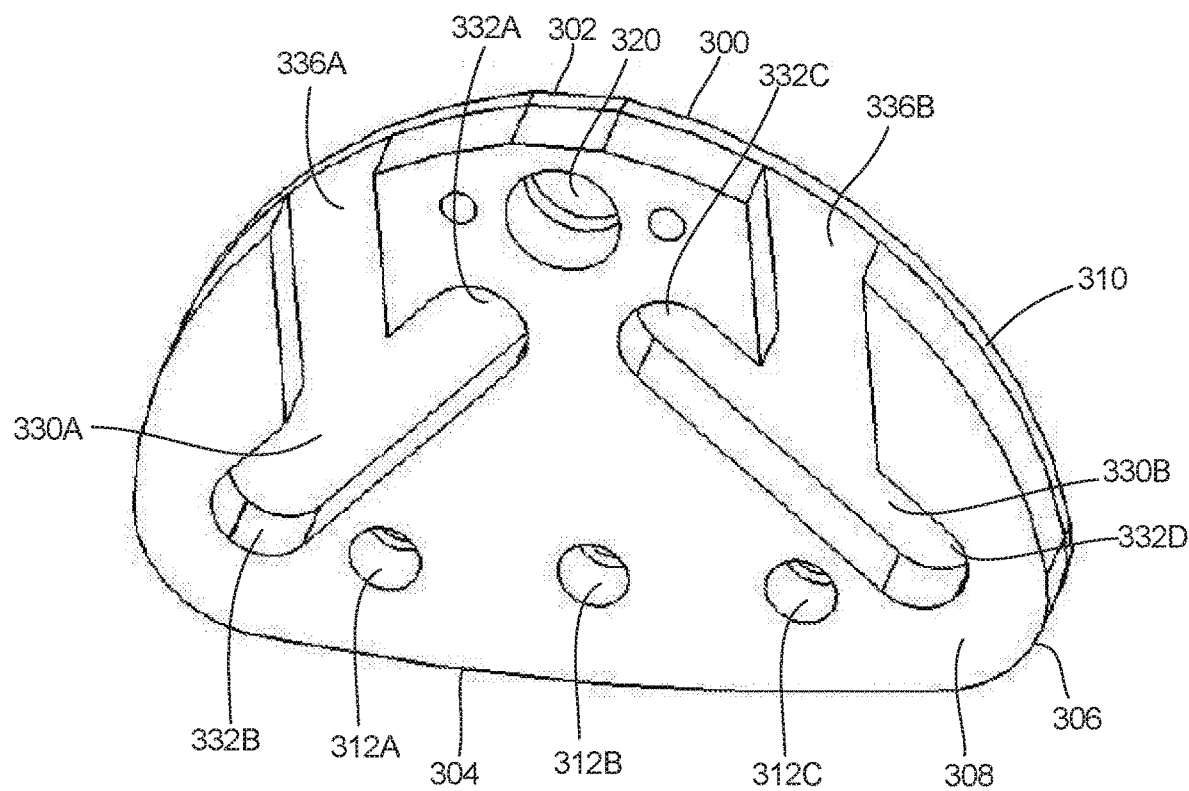
FIG. 3A is a perspective top view of a roller guide plate, according to one embodiment.
Figure 3B:
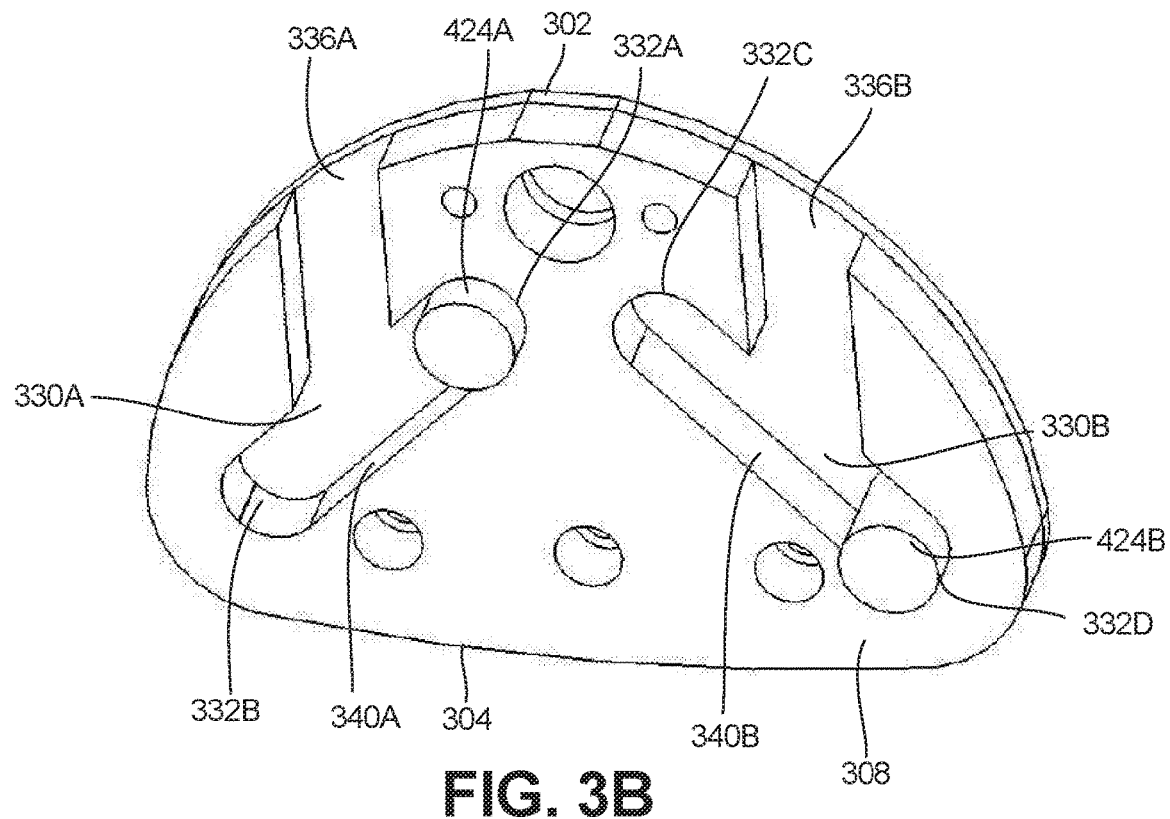
FIG. 3B is a further perspective top view of the embodiment of FIG. 3A with protrusions set into the guide plat journals.
Figure 3C:
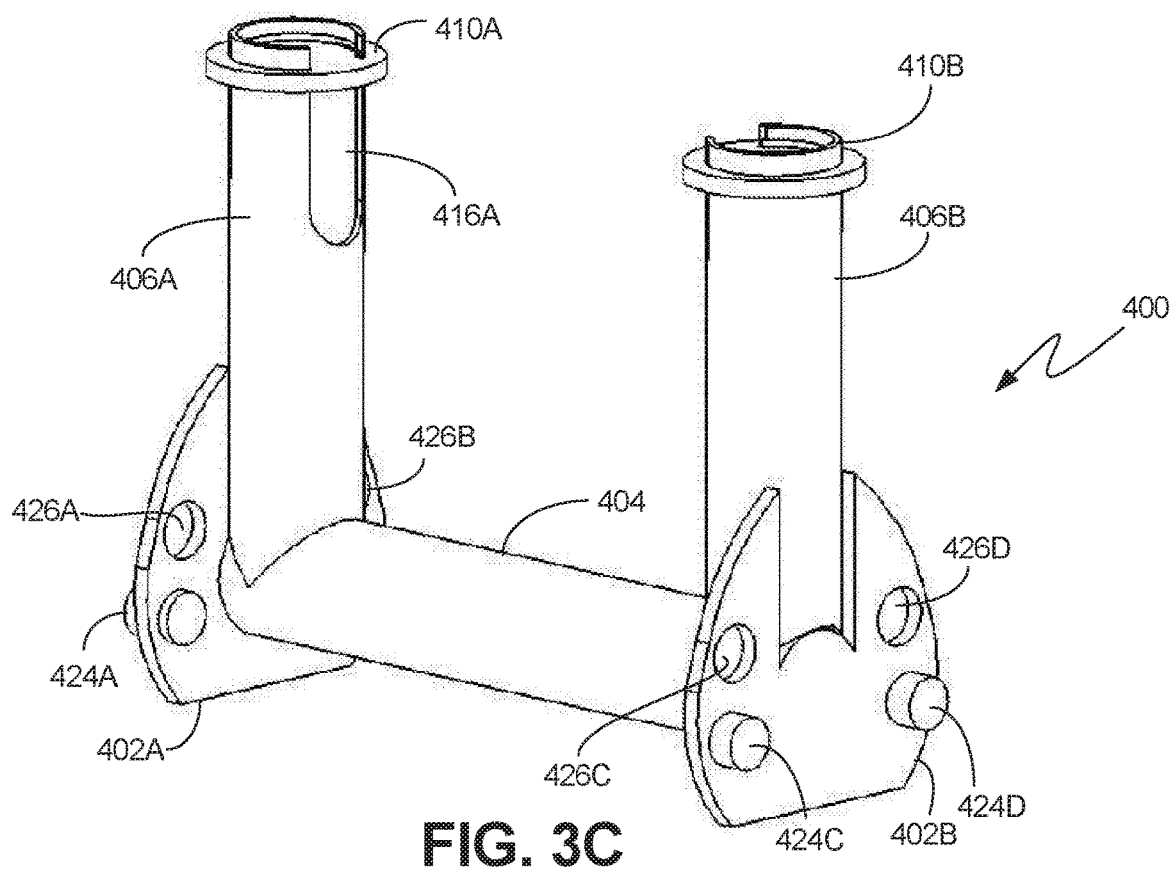
FIG. 3C is a perspective view of a rocker assembly according to one embodiment.
Figure 3D:
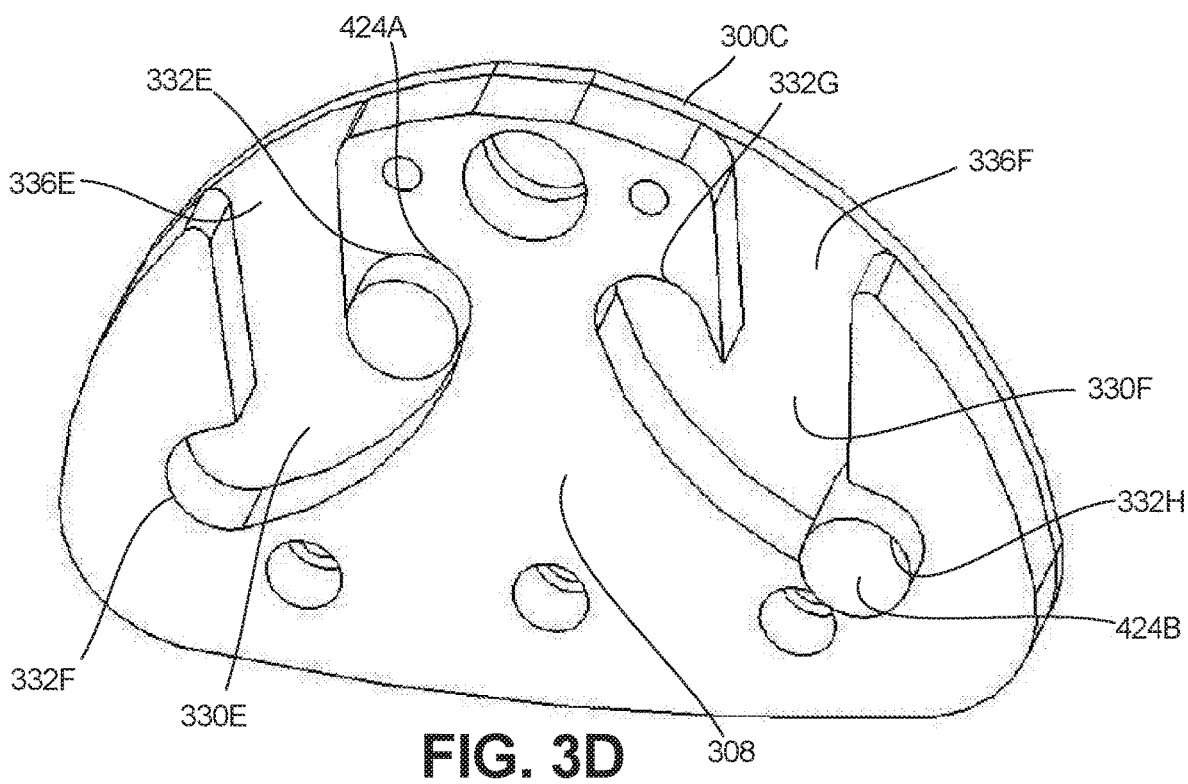
FIG. 3D is a perspective top view of a roller guide plate, according to an alternate embodiment, wherein the journals are in an opposing arc configuration.
Figure 3E:
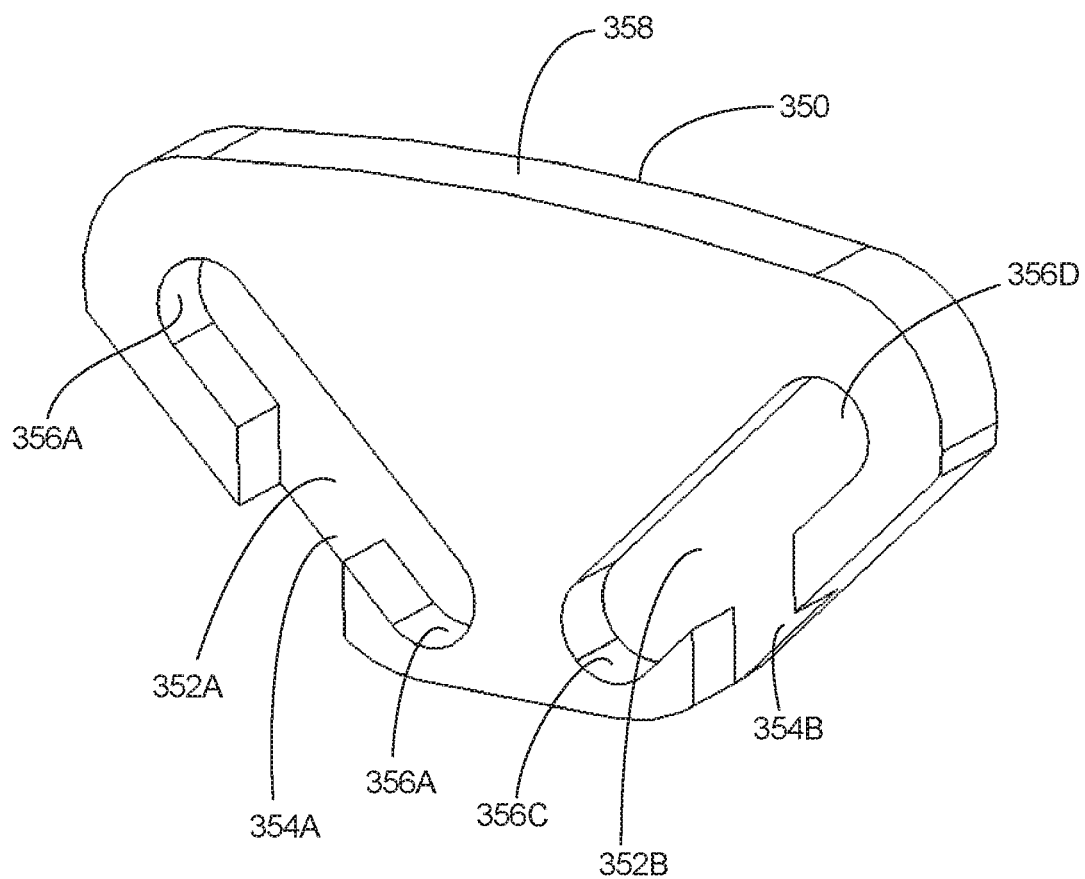
FIG. 3E is a further perspective top view of a roller guide plate, according to yet a further alternate embodiment, wherein the roller guide plate is configured to be mounted directly to the rocker assembly.

As shown in FIGS. 1A-B, the hitch assembly 100 comprises a base assembly 200 (discussed in relation to FIGS. 2A-C) and at least a first roller guide plate 300A, and in exemplary embodiments a second roller guide plate 300B, which are described in detail relation to FIG. 3E. The hitch assembly 100 further comprises a rocker assembly 400, which is described in relation to FIGS. 4A-4J. The rocker assembly 400 further comprises a head assembly 500, depicted in FIGS. 5A-5H. In various embodiments, hitch assembly 100 comprises a gooseneck coupler 600 which is described further in relation to FIGS. 6A-E. FIGS. 7A-B shows a perspective view of a lock assembly. FIGS. 8A-D provide views of embodiments of adapting fifth wheel hitch assembly 100 to industry standard fifth wheel rails. FIGS. 2C and 3E show several alternative embodiments of the hitch assembly 100, such as an alternative base assembly and head positioning method.

Figure 1C:
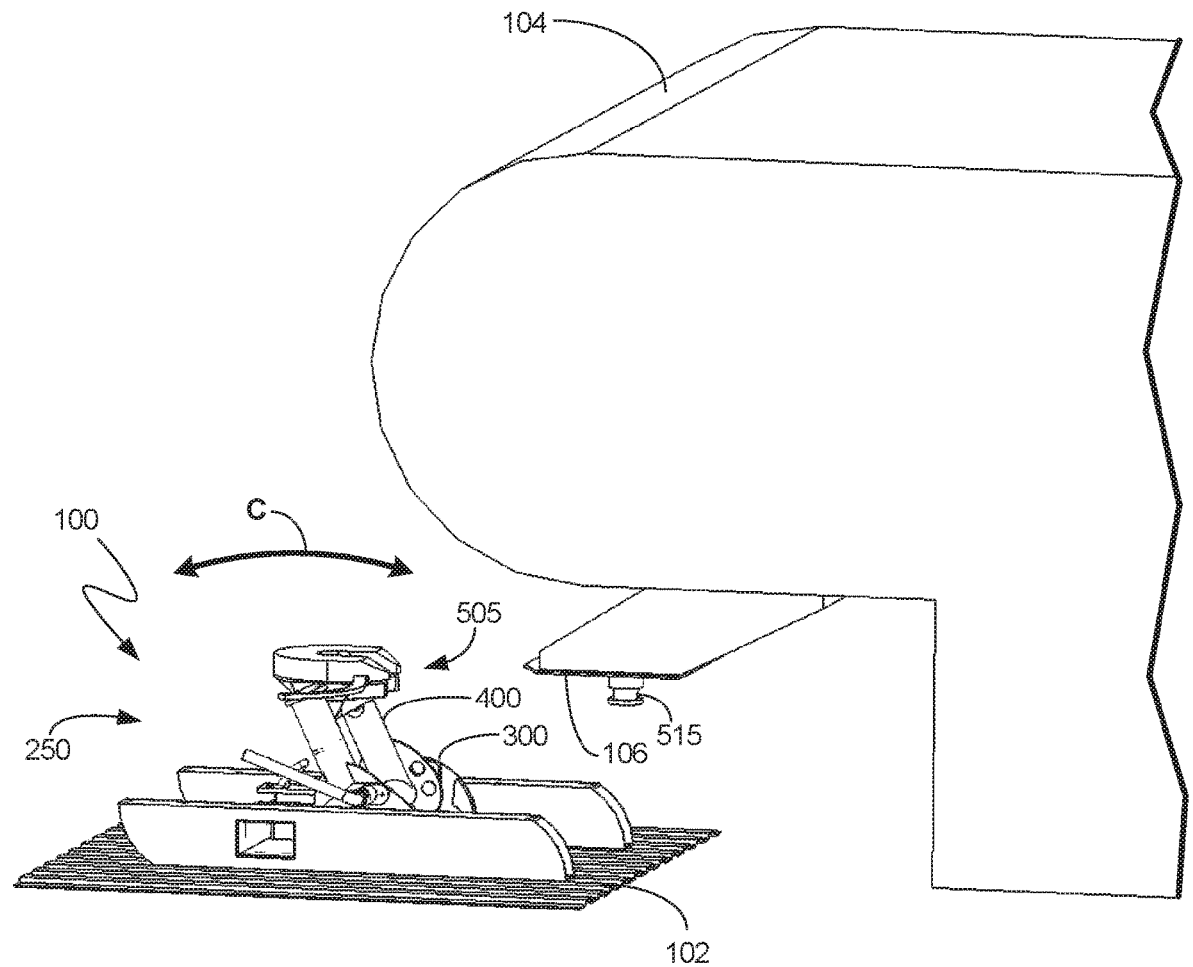
FIG. 1C is a further perspective view of the hitch according to FIG. 1A, further showing a trailer having a king pin.

Turning to the drawings in greater detail, FIG. 1A depicts an exemplary embodiment of the hitch assembly 100 installed into a passenger truck, such as a pick-up truck (as designated by the truck bed 102), so that the assembly 100 can be removed. In prior art implementations, fifth-wheel hitches generally very large and extremely heavy. This poses a problem for the end user, who frequently uses their truck and box for purposes other than hauling a fifth wheel travel trailer, as was discussed above. The hitch assembly 100, by way of the roller guides 300 and journals 330 comprises a slide-pivoting system 250, which enables the user to reposition (as shown at reference arrow C) the head assembly 500 and camper 104 (as shown in FIG. 1C) to provide adequate cab to camper clearance during mounting, as would be apparent to one of skill in the art. The slide-pivoting system 250 does not require bulky supports or travel guide bars, thereby eliminating much of the weight of prior art designs. The slide-pivoting system 250 also solves the problem of a transverse arc motion, thereby eliminating the surge and crash of prior art designs, as is described in detail in relation to FIGS. 4E-F.

As is shown in FIG. 1C, in these embodiments, the assembly 100 is mounted in a truck bed 102 and the hitch head 500 comprises a front opening 505 for receiving a king pin 516 of a fifth wheel trailer or camper 104 and skid plate 106, further discussion of which can be found in relation to FIGS. 5A-H. The various embodiments of the hitch assembly 100 are adapted to be easily mounted into the truck bed 102 by a single person, such as by way of the gooseneck coupler 600, described in relation to FIGS. 6A-E. Mounting of the king pin 516 may also be facilitated by the multi-point jaw system 501, as described in relation to FIGS. 5A-H. Following mounting of the king pin 516, the rocker assembly 400 can be locked into a fixed, forward position (reference arrow A) for transport by way of the lock assembly 700, as is described in relation to FIGS. 7A-B.

As is depicted in FIGS. 2A-B, exemplary embodiments of the base assembly 200 comprise a first base assembly leg 202A and a second base assembly leg 202B and a cross tube 204. As is shown in FIG. 2, each support leg 202A, 202B is generally elongate and further comprises a first support leg end 206A, 206B which are disposed in the direction of the truck cab (designated by reference arrow A) and second support leg end 208A, 208B disposed in the direction of the tailgate (reference arrow B). In certain embodiments theses can comprise tubing, such as square tubing, which contributes strength and torsion rigidity without unnecessary weight. Further, in exemplary embodiments, a series of holes or openings 209 may be disposed on the inner leg surface 202C. These openings 209 can be used to affix the roller guide plates 300A, 300B (as shown in FIG. 2B), which are described further in relation to FIGS. 3A-E.

Continuing with FIGS. 2A-B, in exemplary embodiments, the cross tube 204 is disposed perpendicularly between the first base assembly leg 202A and second base assembly leg 202B so as to create an H-pattern. The cross tube 204 further comprises a first cross tube end 204A and second cross tube end 204B, and as is shown, can be elongate and feature a central opening or lumen 205, for example when square tubing is used. This arrangement is beneficial to the end user because the lumen 205 can act as a handle and the base assembly 200 can be more easily carried.

Further, in the embodiment of the base assembly 200 shown in FIGS. 2A-B, a gooseneck opening 220 is provided substantially in the center of the cross tube 204 between the first cross tube end 204A and second cross tube end 204B. In various implementations, this gooseneck opening 220 can comprise a vertical piece of square tubing sized to house a gooseneck coupler 600, which is discussed further in relation to FIGS. 6A-E. A push block 222 may also be disposed along the cross tube 204 on the cab side (A). In these embodiments, at least one fastener 224 serves as a set bolt and transverses through the push block to the gooseneck opening 220 and cross tube 204.

As shown in FIG. 2C, in alternate embodiments the first base assembly leg 202A and second base assembly leg 202B can also take a C- or L-shape, as would be apparent to one of skill in the art. In this embodiment, the roller guide plates 350A, 350B is fixedly attached to the support arms 406A, 406B and operationally coupled to a plurality of fixed rollers or projections 424A, 424B affixed to the base assembly legs 202A, 202B. In these embodiments, the rocker assembly 400 and head assembly head assembly 500 are able to pivot relative to the base 200 as described below in relation to FIG. 3E.

Turning to the function of the roller guide plates, FIG. 3A depicts an exemplary embodiment of a roller guide plate 300 according to an exemplary embodiment of the hitch assembly 100 slide-pivoting system 250. As will be appreciated by one of skill in the art, and as depicted in FIGS. 1A-B and 4G-H, the depicted roller guide plate 300 can be the first roller guide plate 300A or second roller guide plate 300B. In these embodiments, the roller guide plate 300 is substantially planar and takes a rounded D-shape, such that first side 302 is substantially curved and the second side 304 has a rounded edge 306. The roller guide plate 300 further comprises a first face 308 and second face 310.

In these embodiments, the roller guide plate 300 further comprises a plurality of countersunk holes 312A-C configured to receive bolts to attach to the base assembly legs 202A, 202B, as is shown in FIGS. 2A-B. Further, each roller guide plate 300 can be adjusted up or down within the series of holes or openings 209 on the base legs 202A, 202B to effectively raise or lower the height of the hitch head 500, as is shown in FIG. 2. In typical implementations, each roller guide plate 300 is mounted on the base legs 202A, 202B such that the first side 302 is oriented upwards and the second side 304 is oriented toward the truck bed 102.

Returning to FIG. 3, each roller guide plate 300 further comprises at least one journal 330A, 330B disposed within the roller guide plate 300. These journals 330A, 330B are substantially elongate, rounded openings in the guide plate 300. In the depicted embodiment, a first journal 330A and a second journal 330B are provided, and oriented such that the first journal first end 332A and second journal first end 332C are oriented toward one another at approximately a 45 degree angle from horizontal or the second side 304 of the roller guide plate 300. Accordingly, the first journal second end 332B and second journal second end 332D are oriented away from one another.

Continuing with FIGS. 3A-B, the journals 330A, 330B further comprise an open journal slot 336A, 336B which extends up and through the upper of the roller guide plate 300. In exemplary embodiments, each journal slot 336A, 336B is an elongate, rectangular opening in the first face 308 of the roller plate guide 300 which does not extend through to the second face 310.

Figure 4A:
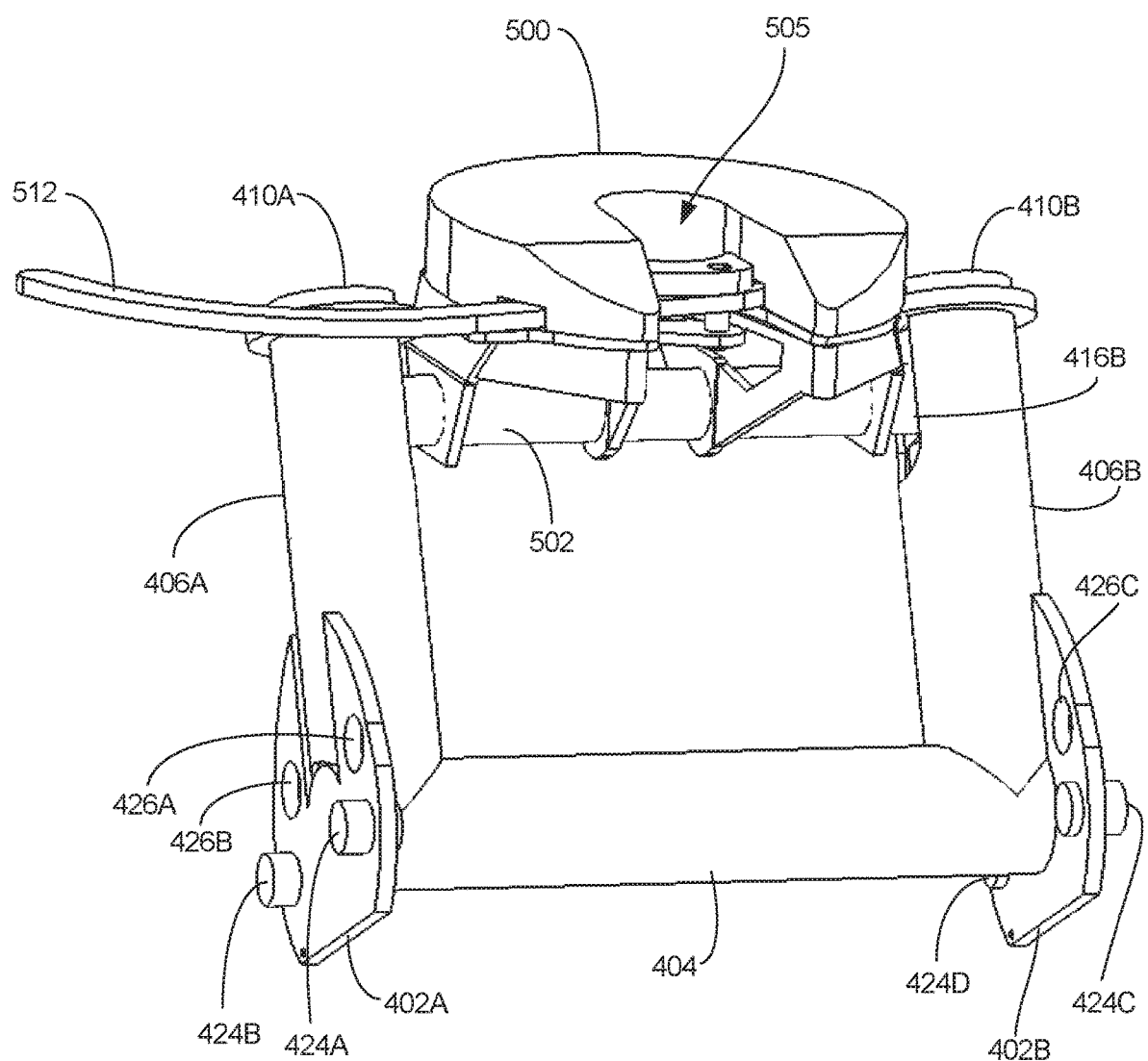
FIG. 4A is a perspective view of a rocker assembly according to one embodiment.
Figure 4B:
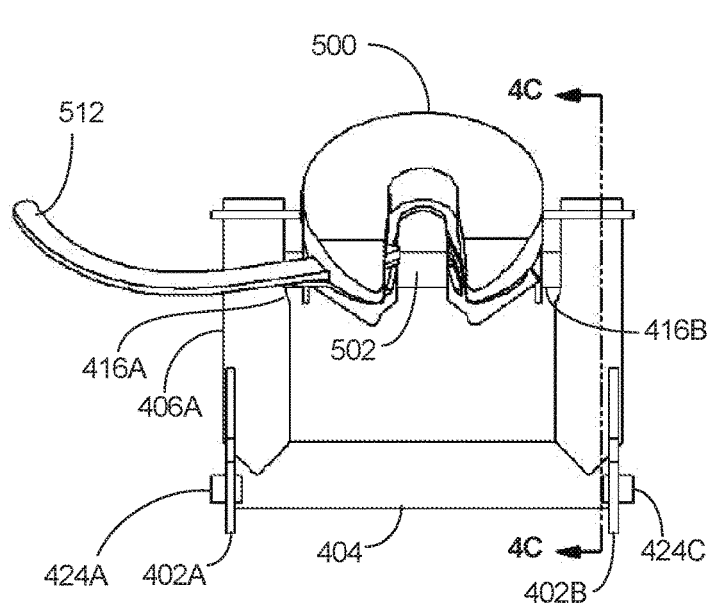
FIG. 4B is a front view of the rocker assembly of FIG. 4A.
Figure 4C:
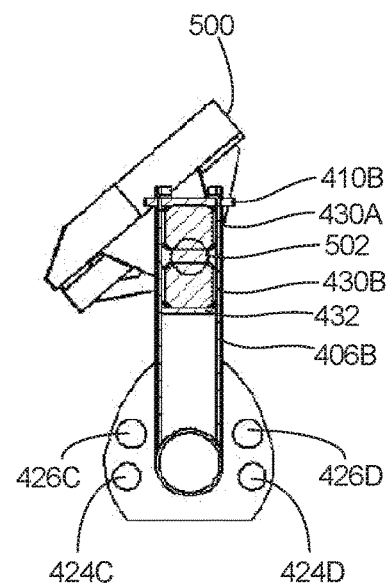
FIG. 4C is a sectional side view of the rocker assembly of FIGS. 4A and 4B, showing the interior of a support arm according to one embodiment.

FIG. 3C depicts the rocker assembly 400 of the hitch assembly 100 slide-pivoting system 250. In this embodiment, the rocker assembly 400 comprises two opposing rocker plates—a first rocker plate 402A and second rocker plate 402B—disposed on opposing ends of a horizontal torsion tube 404, thereby keeping the opposing rocker plates 402A, 402B in alignment. In these embodiments, two support arms 406A, 406B are fixedly attached to the torsion tube 404 and opposing rocker plates 402A, 402B. Each of the support arms 406A, 406B further comprises a cap 410A, 410B which may be secured by various fasteners, such as threads or snap rings (not shown). In these embodiments, and as best shown in FIGS. 4A-C, a support bar 502 is disposed between the support arms 406A, 406B, such that the head assembly 500 can be mounted on the rocker assembly 400.

Returning to FIGS. 3A-B, in exemplary embodiments, the journal slots 336A, 336B can receive the fixed rollers or projections 424A-424D that are disposed on the rocker assembly 400, as is depicted in FIG. 3C. The roller guide plates 300A, 300B also feature a lock alignment hole 320 near the first end 302 for receiving a pivot lock pin 708, as is shown in FIGS. 7A-B. These roller guide plates 300 are thus configured to receive the rocker assembly 400 and fixedly attach it to the base legs 202A, 202B.

Figure 4D:
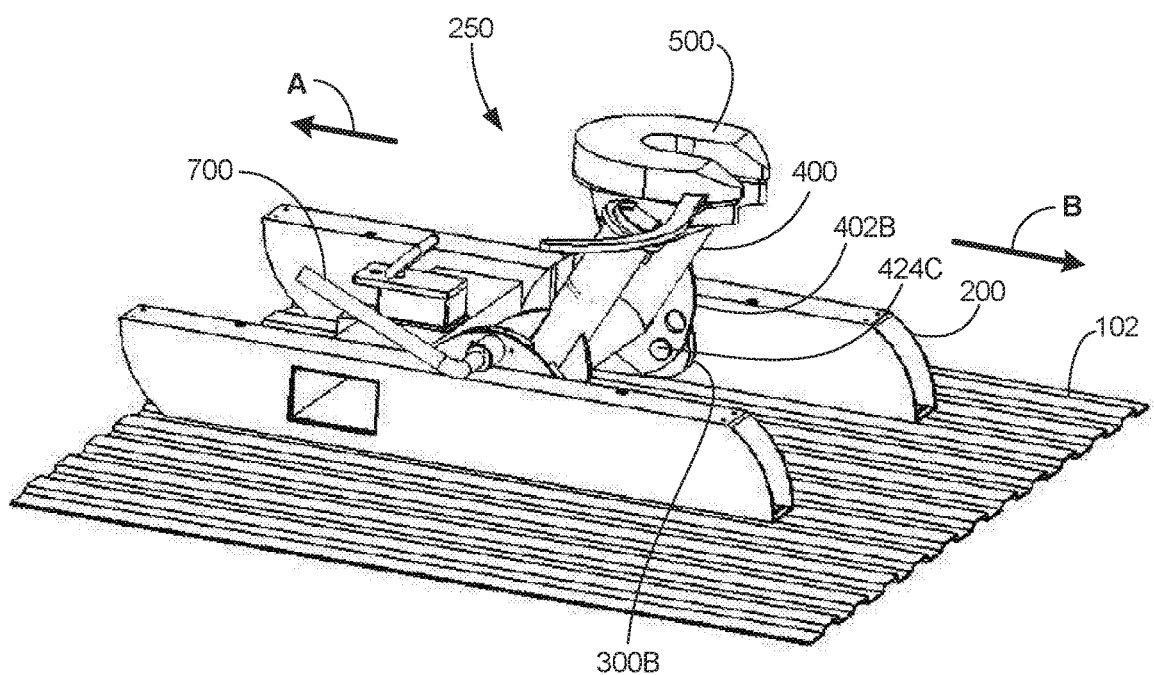
FIG. 4D is a perspective view of a hitch assembly operating in the maneuvering mode, according to one embodiment.
Figure 4E:
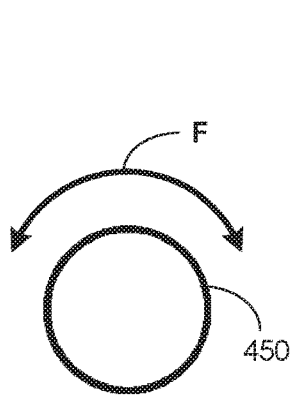
FIG. 4E is a representative view of a single axle pivot system.
Figure 4F:
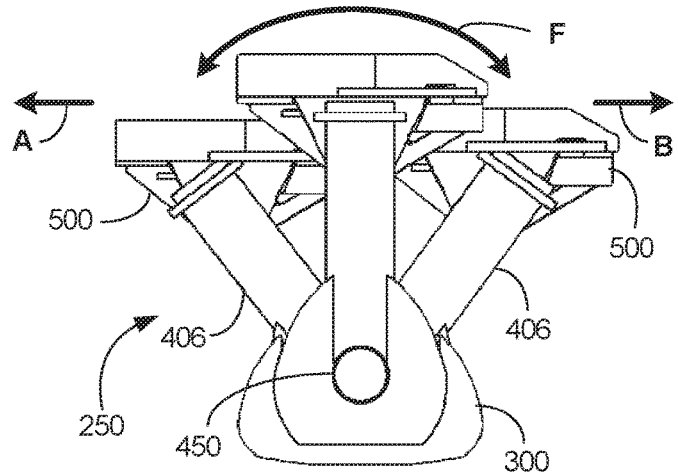
FIG. 4F is a side view of the single pivot system of FIG. 4E, showing movement of the rocker assembly and hitch head.

FIG. 3D depicts an alternate opposing arc roller guide plate 300C of the hitch assembly 100 slide-pivoting system 250. The opposing arc roller guide plate 300C again comprises a first journal 330E having a first journal first end 332E and first journal second end 332F and a second journal 330F comprising a second journal first end 332G and second journal second end 332H. In the opposing arc roller guide plate 300C embodiment, these ends 332E, 332F and 332G, 332H are disposed such that the first journal 330E and second journal 330F have opposing arc arrangements, so as to be substantially curved from away from the center first face 308 of the roller guide plate. Accordingly, as shown in FIGS. 4I-J, the projections 424A, 424B travel in the same manner following the paths within the journals, however the resultant motion reduces the hitch head 500 arc (as designated by reference arrow J in FIG. 4J). As is shown in FIG. 3D, a first journal slot 336E and second journal slot 336F can also be provided for coupling of the rocker assembly 400.

In FIG. 3E, an alternative guide plate 350 is depicted, as was also shown in FIG. 2C. In this embodiment, the roller guide plate 350 is fixedly attached to the support arms 406A, 406B and operationally coupled to a plurality of fixed rollers or projections 424A, 424B. As shown is also shown in FIG. 2C, in these embodiments, the rocker assembly 400 and head assembly head assembly 500 are able to pivot relative to the base 200.

Continuing with FIG. 3E, the alternate guide plate 350 also comprises a first journal guide 352A and second journal guide 352B. The guide plate 350 also has journal slots 354A, 354B that can receive the fixed rollers or projections as described above. In this embodiment, a first guide journal 352A and a second guide journal 352B are provided, and oriented such that the first journal first end 356A and second journal first end 356C are oriented toward one another at approximately a 45 degree angle from horizontal or the second side 358 of the roller guide plate 350. Accordingly, the first journal second end 356B and second journal second end 356D are oriented away from one another. In practice, the projections 424A, 424B can again be placed inside the guide plate 350 as above, so as to allow the slidable rotation of the guide plate 350 relative to the projections 424A, 424B, as shown in FIG. 2C.

FIG. 4A depicts the rocker assembly 400 comprising the head assembly 500. In this embodiment, the rocker assembly 400 comprises two opposing rocker plates—a first rocker plate 402A and second rocker plate 402B-disposed on opposing ends of a horizontal torsion tube 404, thereby keeping the opposing rocker plates 402A, 402B in alignment. In these embodiments, two support arms 406A, 406B are fixedly attached to the torsion tube 404 and opposing rocker plates 402A, 402B.

As is further depicted in FIG. 4A, each of the support arms 406A, 406B further comprises a cap 410A, 410B which may be secured by various fasteners, such as threads or snap rings (not shown). In these embodiments, and as best shown in FIGS. 4B-C, a support bar 502 is disposed between the support arms 406A, 406B, such that the head assembly 500 can be mounted on the rocker assembly 400. A jaw mechanism 501 attached to the hitch head 500 releasably secures a king pin (shown in FIG. 5C at 516) within the hitch head 500.

Figure 4G:
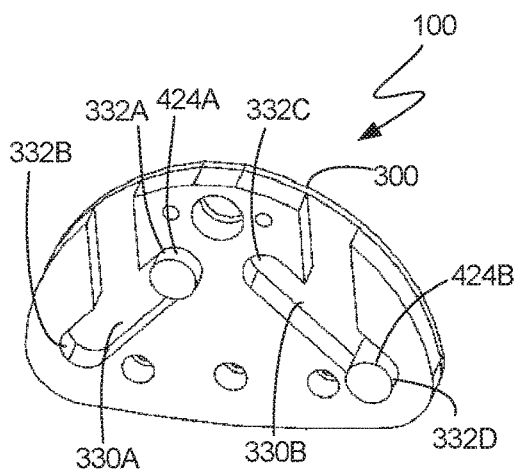
FIG. 4G is a perspective view of the roller guide plate utilized in FIG. 4H.
Figure 4H:
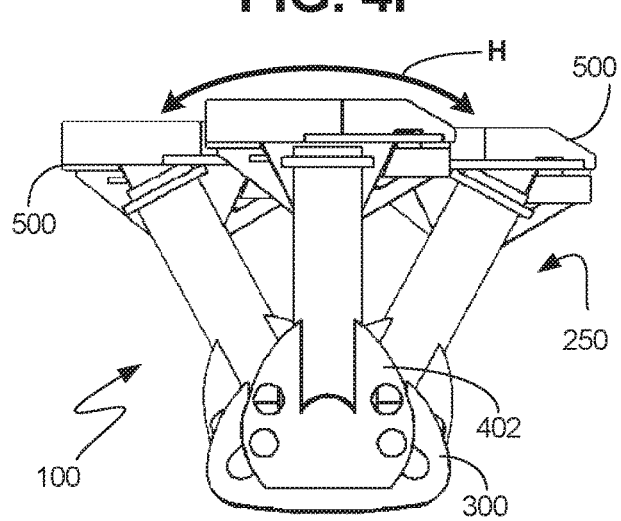
FIG. 4H is a side view showing movement of the rocker assembly and hitch head with the guide plate of FIG. 4G.
Figure 4I:
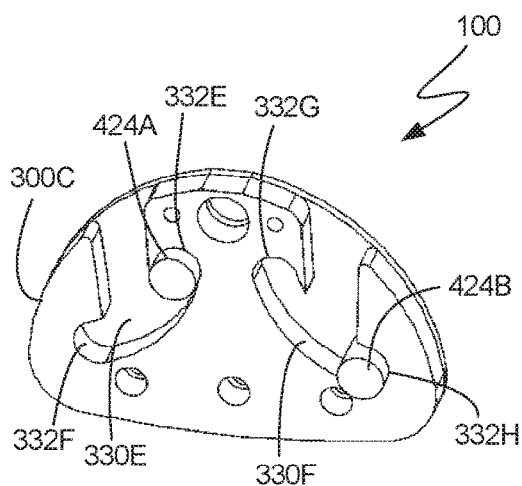
FIG. 4I is a perspective view of the roller guide plate utilized in FIG. 4J.
Figure 4J:
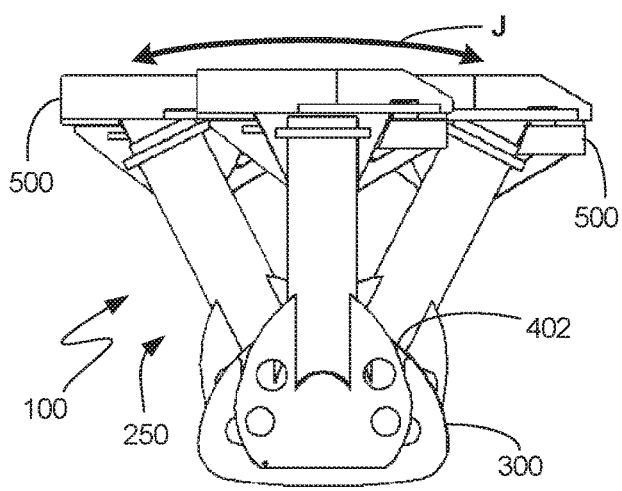
FIG. 4J is a side view showing movement of the rocker assembly and hitch head with the guide plate of FIG. 4I.

Returning to FIG. 4A, in these embodiments, each of the opposing rocker plates 402A, 402B further comprise a plurality of fixed rollers or projections 424A, 424B, 424C, 424D configured to be in operational communication within the journals 330A, 330B of the roller guide plates 300A, 300B, as discussed further in relation to FIGS. 4G and 4I. In these embodiments, the opposing rocker plates 402A, 402B further comprise a plurality of pivot lock openings 426A, 426B, 426C, 426D configured to allow the selective pivoting of the rocker assembly 400 by receiving a lock pin 708, as described in relation to FIGS. 7A-B.

Turning to FIGS. 4B-C, each support arm 406A, 406B can comprise cushioned rubber springs, or aeons 430. As shown in FIG. 4C, the second support arm 406B comprises an upper aeon 430A and lower aeon 430B that are disposed about the support bar 502. These aeons 430A, 430B may be supported inside the support arms 406A, 406B by an aeon stop plate 432. The aeons 430A, 430B may also be pre-loaded around the support bar 502 and capped with a circular tube cap 410B, which in turn can be secured by various fasteners, such as threads or snap rings (not shown). In certain implementations, a slot 416 within each support arm 406A, 406B allows the support bar 502 to shift within each support arm 406A, 406B to absorb vibrational and impulse forces derived from pulling a fifth wheel trailer, such that the support bar can move with resistance within the aeons 430A, 430B. In some implementations, the aeons 430A, 430B Further implementations would be apparent to one of skill in the art. FIG. 4B also depicts an embodiment featuring a slide handle 512, which is described further in relation to FIG. 5A.

FIG. 4D depicts the fifth wheel hitch assembly 100 in the maneuvering position. In FIG. 4D, the hitch head 500 is oriented in an aft position on the rocker assembly 400.

As shown in FIGS. 4E-F, in a single axle 450 arrangement, the rocker assembly 400 swings the hitch head through the arc at reference arrow F, which corresponds to a semi-circle having a radius extending from the head 500 to the center of the axle 450.

The rocker assembly 400 embodiments shown in FIGS. 4G and 4H is able to move fore and aft (designated with reference arrows A and B in FIG. 4D) by controlling the motion of the fixed rollers, pegs or projections 424A-424D within the journals 330A-D located within the roller guide plates 300A, 300B. In these embodiments, the rollers or projections 424A-424D are fixedly attached to the opposing rocker plates 402A, 402B in pairs at a fixed distance. For example 424A and 424B, which are mounted on the first opposing rocker plate 402A. When a first projection 424A moves down at about a forty-five degree angle in a first journal 330A (toward the first journal second end 332B) in response to pressure applied to the hitch head. The paired projection 424B correspondingly moves up at about a forty-five degree angle in the second journal 330B toward the second journal second end 332C as is shown in FIG. 4G. As a result, the arc of the hitch head 500 is reduced, as is shown in FIG. 4H.

In these embodiments, the movement of the projections 424A-424D relative to the journals 330A-D occurs on both roller guide plates 300A, 300B, and therefore results in the movement of the rocker assembly 400 relative to the roller guide plates 300A, 300B as shown in FIG. 4H. This offsetting motion cancels out most of the arc (as designated by reference arrow F) that develops in a single point pivot system, as is depicted in FIG. 4F, where the hitch head 500 is moving along arc (as designated by reference arrow F). Further, the resulting transition between the various positions is much smoother and easier to control.

FIGS. 4I and 4J depict a second embodiment of the hitch assembly 100 having an opposing arc roller guide plate 300C. In these embodiments, the plate 300C again comprises a first journal 330E having a first journal first end 332E and first journal second end 332F and a second journal 330F comprising a second journal first end 332G and second journal second end 332H. Collectively, these ends 332E, 332F and 332G, 332H are disposed such that the first journal 330E and second journal 330F have opposing arc arrangements. Accordingly, the projections 424A, 424B travel in the same manner following the paths within the journals, however the resultant motion reduces the hitch head 500 arc (as designated by reference arrow J).

Figure 5A:
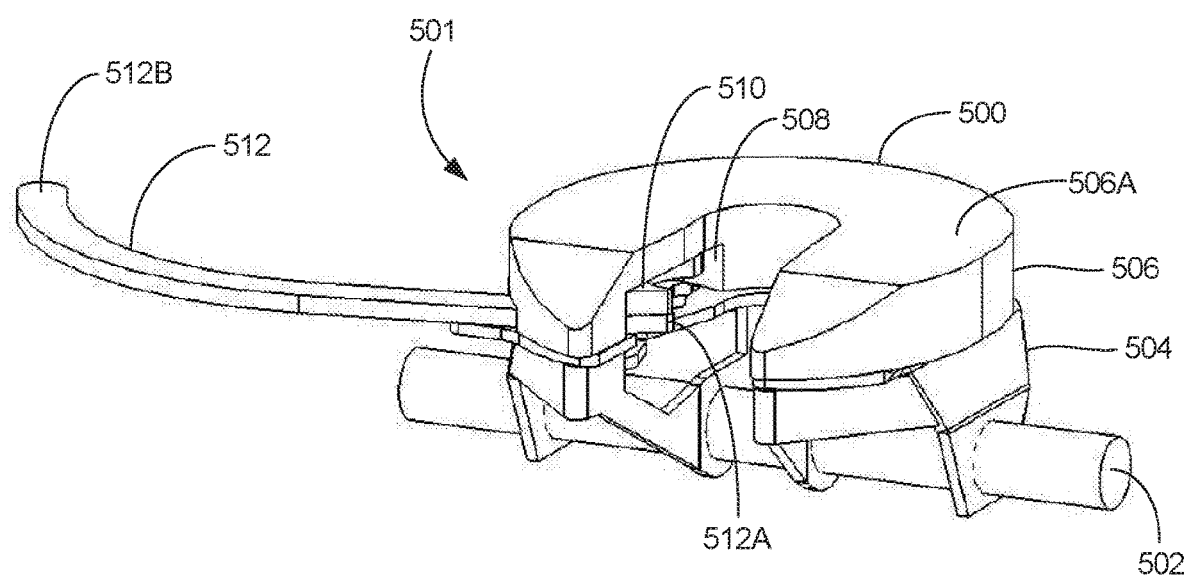
FIG. 5A is a perspective view of the head assembly, according to an exemplary embodiment comprising a multi-point jaw system.
Figure 5B:
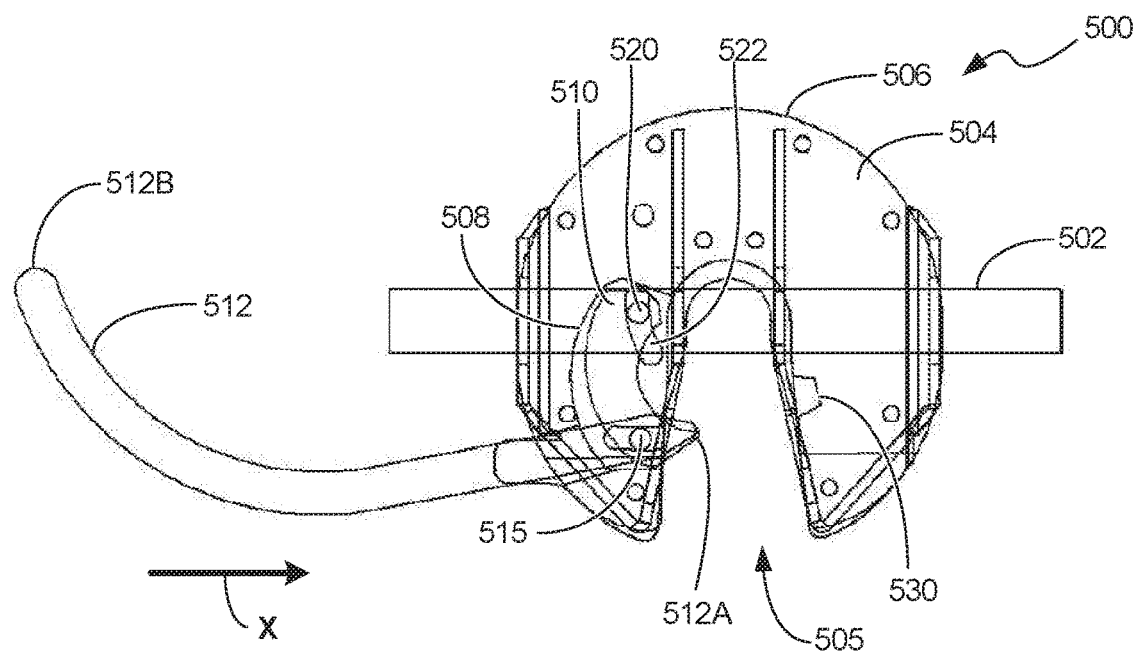
FIG. 5B is a top cut-away view of the head showing the upper jaw, according to an exemplary embodiment.
Figure 5C:
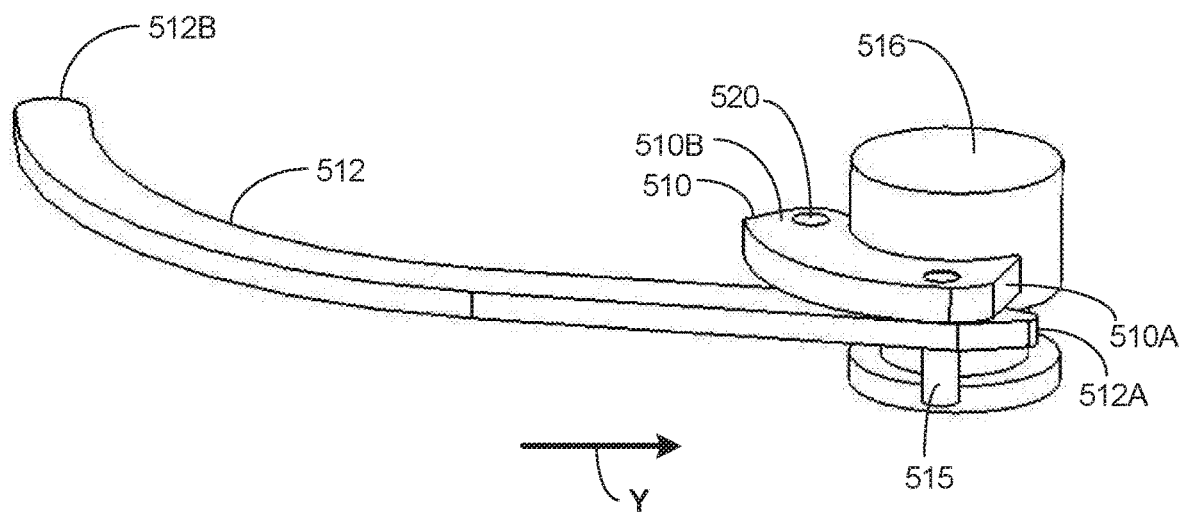
FIG. 5C is an upper perspective view of the upper jaw and slide handle of FIG. 5B coupling with a king pin.
Figure 5D:
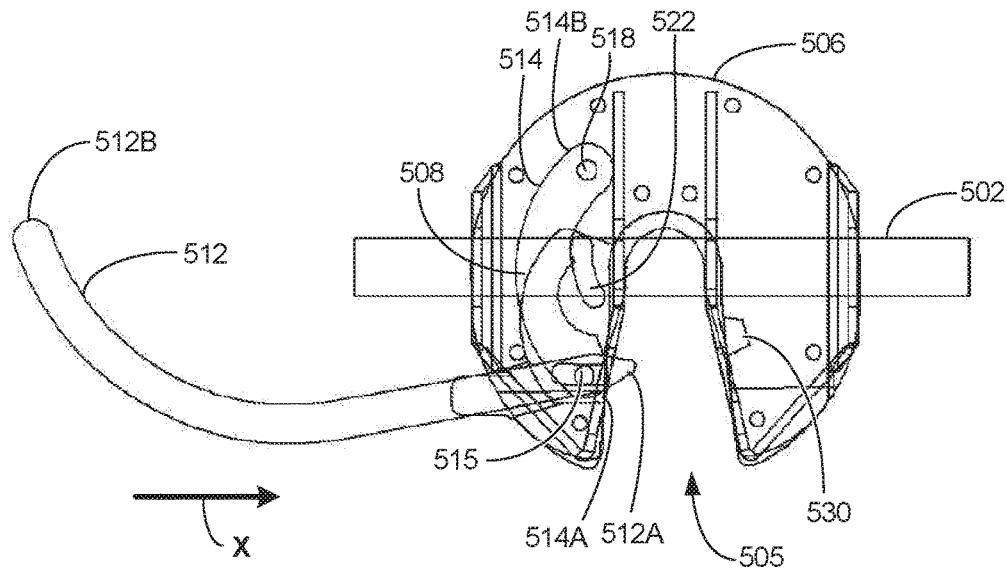
FIG. 5D is a top cut-away view of the head showing the lower jaw, according to an exemplary embodiment.

FIGS. 5A-E depict various views of the head assembly 500 which can optionally comprise an optional multi-point jaw system 501. The multi-point jaw system 501 is not necessary for the assembly 100 to function, as is shown in FIG. 5I. In exemplary embodiments, the head assembly 500 comprises a generally elongate support bar 502 and a lower head portion 504 which is fixedly or pivotally attached to the elongate support bar 502, as is known in the art. In these embodiments, the head assembly 500 further has a king pin opening 505 configured to receive a king pin 516, as is shown in FIG. 5B. Attached to the lower head portion 504 is an upper head portion 506. In various embodiments, the upper head portion 506 provides an upper planar surface 506A that the skid plate 106 of a camper 104 can rest and pivots on. As shown in FIG. 5D, the upper head portion 506 also has an opening 505 to receive a king pin 516. In certain embodiments, the head assembly 500 can be comprised of metal, such as steel, plastic, or other materials known in the art. One of the principle advantages of the disclosed apparatus, systems and methods is weight conservation, and the use of plastic, particularly for the upper portion 506 provides a weight advantage over prior art hitches. Additionally, plastic can be used to reduce the friction on the planar upper surface 506A as the skid plate 106 or king pin 516 move on the planar upper surface 506A.

Figure 5E:
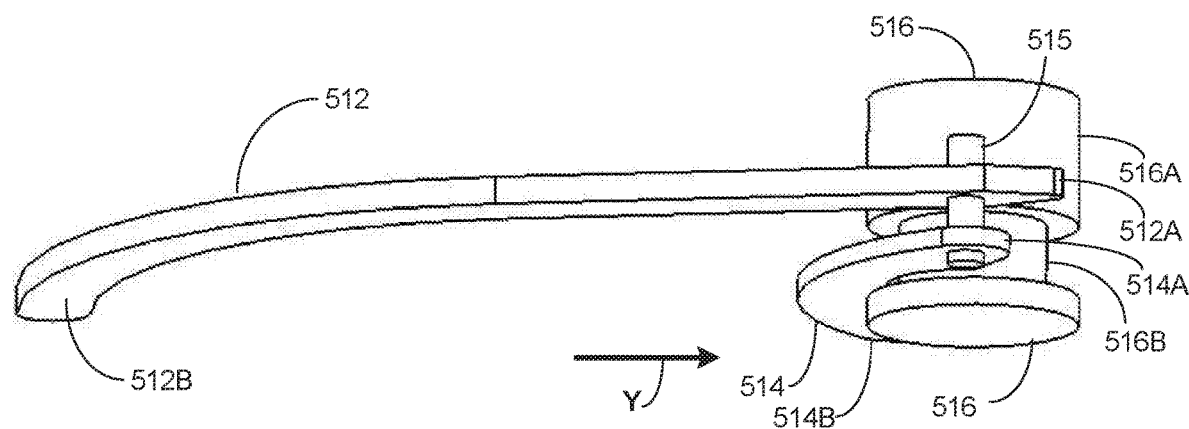
FIG. 5E is a lower perspective view of the lower jaw and slide handle of FIG. 5D coupling with a king pin.
Figure 5F:
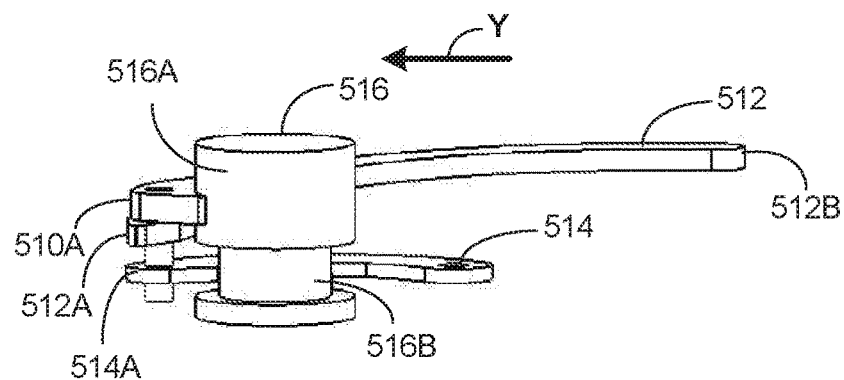
FIG. 5F is a reverse view of the upper and lower jaws and a king pin, according to an exemplary embodiment.
Figure 5G:
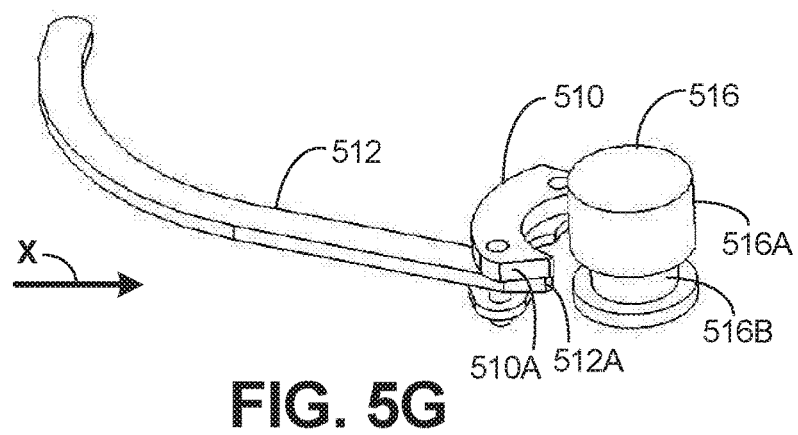
FIG. 5G is a further perspective view of the hitch assembly multi-point jaw system in an open, or uncoupled configuration, according to an exemplary embodiment.
Figure 5H:
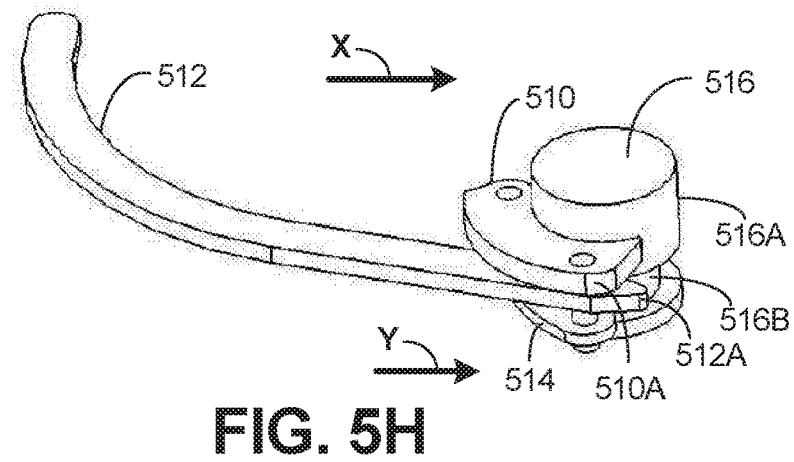
FIG. 5H is a further perspective view of the hitch assembly multi-point jaw system in a closed, or coupled configuration, according to an exemplary embodiment.
Figure 5I:
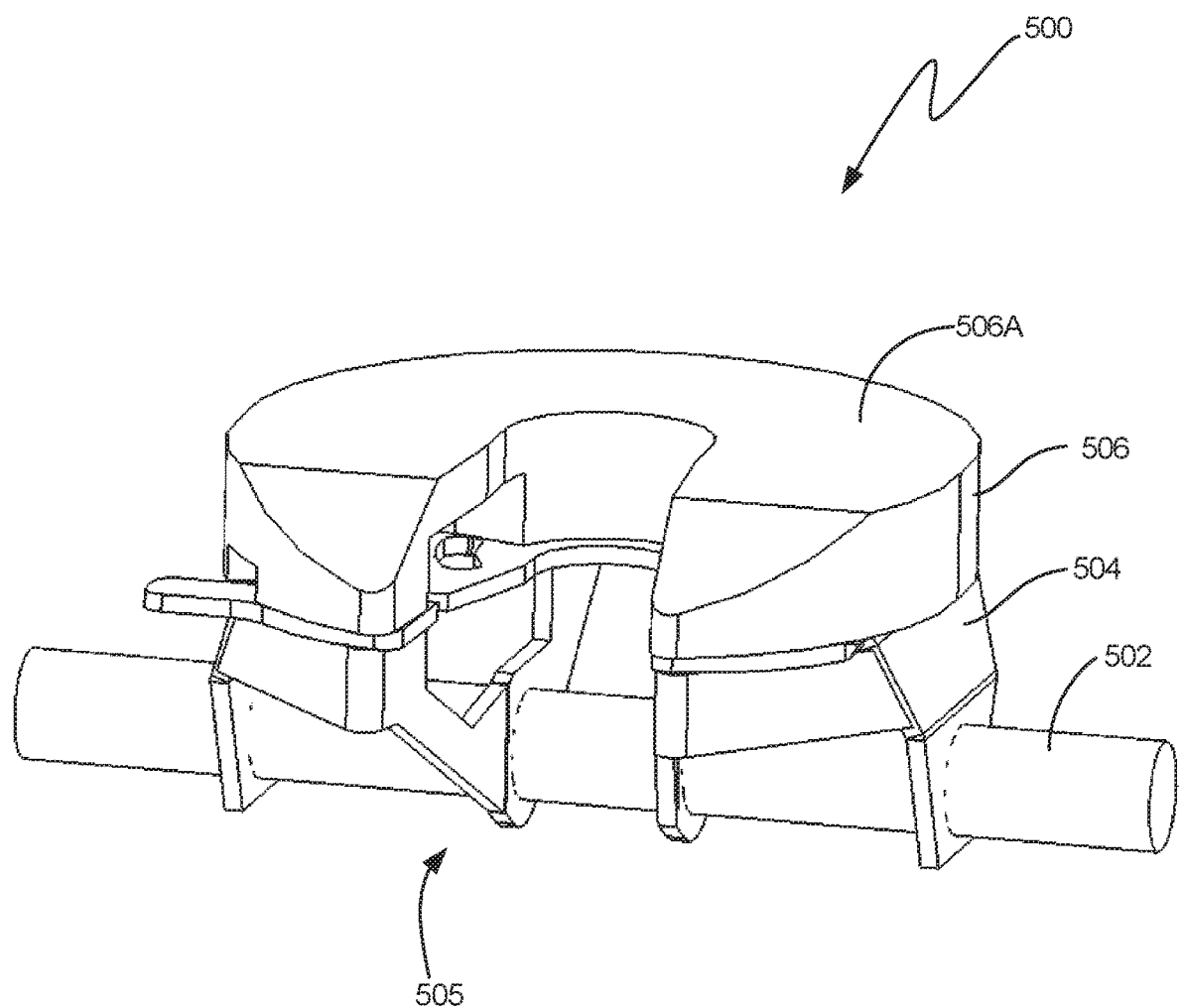
FIG. 5I is a perspective view of an embodiment of the head assembly without a multi-point jaw system.
Figure 6A:
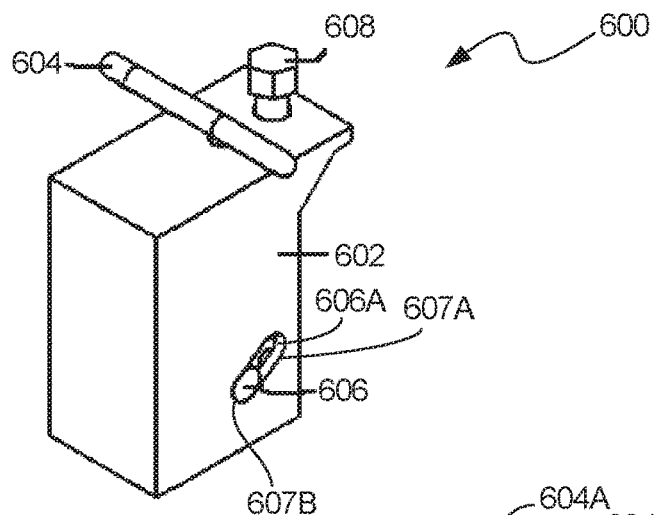
FIG. 6A is a perspective view of the gooseneck ball coupler according to an exemplary embodiment.
Figure 6B:
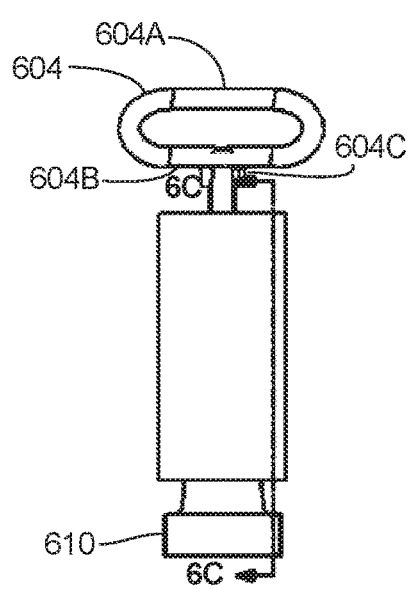
FIG. 6B is a front view of the gooseneck ball coupler according to the embodiment of FIG. 6A in the unlocked position.

As is also shown in FIGS. 5A-H, in exemplary embodiments, the head assembly 500 comprises a multi-point jaw system 501 configured to be capable of both an open and a closed position, so as to selectively grasp and secure a cylindrical king pin 516 at least one location. As best shown in FIGS. 5F-H, a king pin 516 frequently has portions having different circumferences, such as an upper king pin portion 516A and lower king pin portion 516B. Other examples are possible and known in the art. One aim of the embodiments of the assembly 100 comprising the multi-point jaw system 501 is to eliminate the excess tolerances of prior art systems by snugly grasping each of the upper king pin portion 516A and lower king pin portion 516B separately.

In these embodiments, the hitch head 500 can further comprise at least one of an opening or pocket 508, an upper clasping jaw 510, a hitch handle 512 having a first slide handle end 512A and second slide handle end 512B, and a lower clasping jaw 514, all of which are in mechanical communication such that movement of the slide handle is able to urge the upper clasping jaw 510 and lower clasping jaw 514 into an engaged position around a king pin 516. In certain embodiments, a mechanism such as a spring can be provided which is configured to urge the upper clasping jaw 510 and/or lower clasping jaw 514 into the closed position. For example, in the embodiments depicted in FIGS. 5A-E, the jaw system 501 comprises an upper clasping jaw 510 and lower clasping jaw 514 which are both selectively pivoted by the hitch handle 512, which can be an elongate curved handle, as shown in the depicted embodiments. In these embodiments, the upper clasping jaw 510 and lower clasping jaw 514 are thereby configured to grasp the king pin 516 at the upper king pin portion 516A and lower king pin portion 516B, respectively.

As shown in FIGS. 5B-H, in these embodiments, the slide handle 512 is in rotational or operational communication with the upper clasping jaw 510 and lower clasping jaw 514 through an elongate pivot rod 515. The pivot rod 515 controls the first ends 510A and 514A of both the upper clasping jaw 510 and the lower clasping jaw 514, such that as the slide handle 512 moves (shown by reference arrow X), a corresponding movement of the slide handle's first end 512A and the first ends of the jaws 510A, 514A (shown by reference arrow Y) occurs across the opening 505 and around the king pin 516. In the locked or closed, engaged position, the slide handle first end 512A can be fitted into an opening 530 on the opposite side of the head 500. Accordingly, a user is able to quickly set the jaw system 501 into a closed and locked engaged position. In exemplary embodiments, a spring, clasp, or other mechanical systems can be combined with the multi-point jaw system 501 to secure the system into the engaged position.

In these embodiments, the translational movement of the opposite end 510B of the upper clasping jaw 510 slides by way of a catch rod 520, which slides within a slot 522, located in the lower head portion 504. The movement of the opposite end 510B of the upper clasping jaw is relative to the position of the first end 510A of the upper clasping jaw 510. As the first end 510A of the upper clasping jaw 510 is transitioned to the secured position thereby closing the opening 505, the catch rod 520 is pulled along the slot 522 directional towards the center and rear of the hitch, thus moving the opposite end 510B outwardly from the opening or pocket 508 and directional towards the center and rear of the hitch and tangent to the king pin 516. The movement is reversed upon the upper clasping jaw 510 transitioning to the retracted or open position, thereby stowing the upper clasping jaw 510 back within the opening or pocket 508. Controlling the end 510B of the upper clasping jaw 510 allows the upper clasping jaw 510 to be stowed in the opening or pocket 508 of the upper head portion 506, though other embodiments are possible. In any event, the translational movement of the opposite end 514B of the lower clasping jaw 514 pivots about a forward pivot point 518 located in the lower head portion 504.

Continuing with FIGS. 5B-D, the movement of the lower clasping jaw 514 is determined by the pivot point 518, which controls the sweeping motion of the slide handle 512 and the pivot rod 515. The combined effect allows for two separate jaws 510, 514 to selectively open and retract to secure a king pin 516 at the upper king pin portion 516A and lower king pin portion 516B in the engaged position.

FIG. 5B shows an upper view of the slide handle 512 and upper clasping jaw 510 in the retracted position. FIG. 5C shows the slide handle 512 and upper clasping jaw 510 in the closed or secured position, so as to be configured to wrap around the upper, larger outside dimension of a upper king pin portion 516A. FIG. 5D shows an upper view of the slide handle 512 and lower clasping jaw 514 in the retracted position. FIG. 5E shows the slide handle 512 and lower clasping jaw 514 in the closed or secured position, so as to be able to wrap around the interior, smaller diameter of the lower king pin portion 516B and into the engaged position.

As is also shown in FIG. 5I, certain embodiments of the head assembly 500 do not comprise a multi-point jaw system. In this embodiment, the head assembly 500 comprises a generally elongate support bar 502 and a lower head portion 504 that is fixedly or pivotally attached to the elongate support bar 502, as is known in the art. In these embodiments, the head assembly 500 further has a king pin opening 505 configured to receive a king pin 516, as is shown in FIG. 5B. Attached to the lower head portion 504 is an upper head portion 506.

Turning to the various embodiments of the gooseneck coupler, FIGS. 6A-D depict a gooseneck coupler 600 according to an exemplary embodiment. In this embodiment, the gooseneck coupler 600 comprises a coupler housing 602 sized to be received by the gooseneck opening 220 within the base assembly 200 depicted in FIGS. 1-2. The coupler housing comprises a central lumen 602A sized to accommodate a gooseneck ball 610.

In these embodiments, a release lever 604 is attached through a linkage 605 to the ball lock pin 606. In the depicted embodiments, the release lever comprises a distal end 604A and a proximal end 604B, and is capable of being rotated about a pivot 604C, as depicted in FIG. 6BE. In the depicted embodiment, the ball lock pin 606 is disposed across the lumen of the housing 602A and travels within at least one slot 606A having a first slot end 607A and second slot end 607B. In various embodiments, the slot 606A is set in the wall of the coupler housing 602, and can be disposed at an angle such that the first slot end 607A is disposed above the second slot end 607B. As would be appreciated by one of skill in the art, in certain embodiments a paired slot (not shown) can appear on the opposite side of the coupler housing 602 from the first slot 606A, while in alternate embodiments, other mechanisms, such as a flange, can be used to maintain the orientation of ball lock pin 606. In certain embodiments, a tightening bolt 608 is threaded into the coupler housing 602 and is configured to be able to push against a push block 212 attached to the base assembly 200.

Figure 6C:
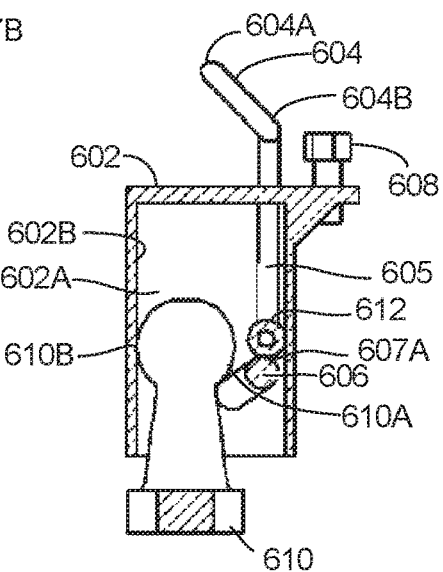
FIG. 6C is a section view of the gooseneck coupler according to the embodiment of FIG. 6A in the unlocked position.
Figure 6D:
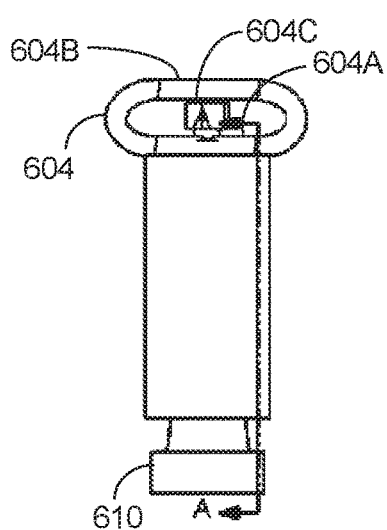
FIG. 6D is a front view of the gooseneck ball coupler according to the embodiment of FIG. 6A in the locked position.
Figure 7A:
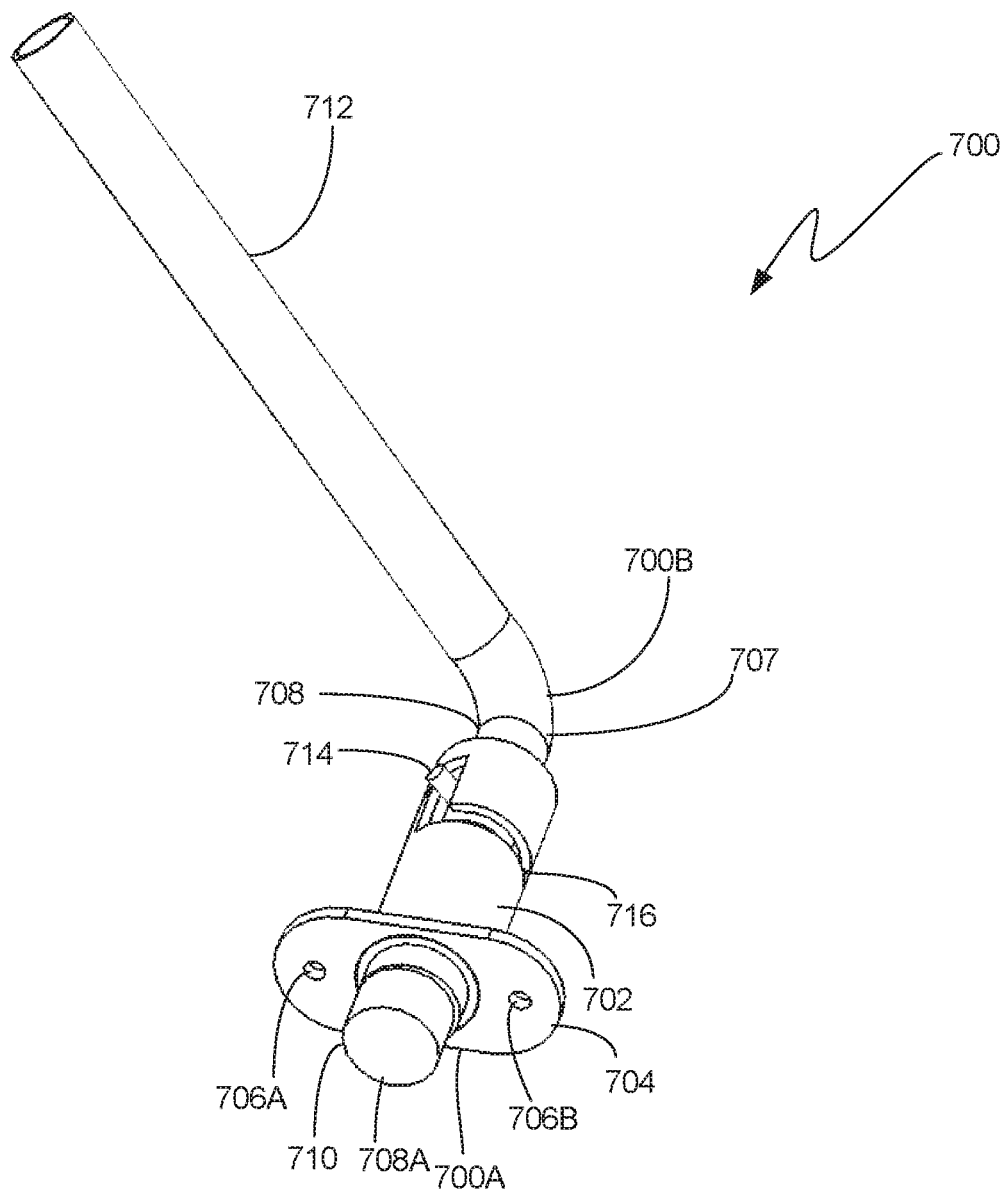
FIG. 7A is a perspective view of the lock assembly, according to an exemplary embodiment.
Figure 7B:
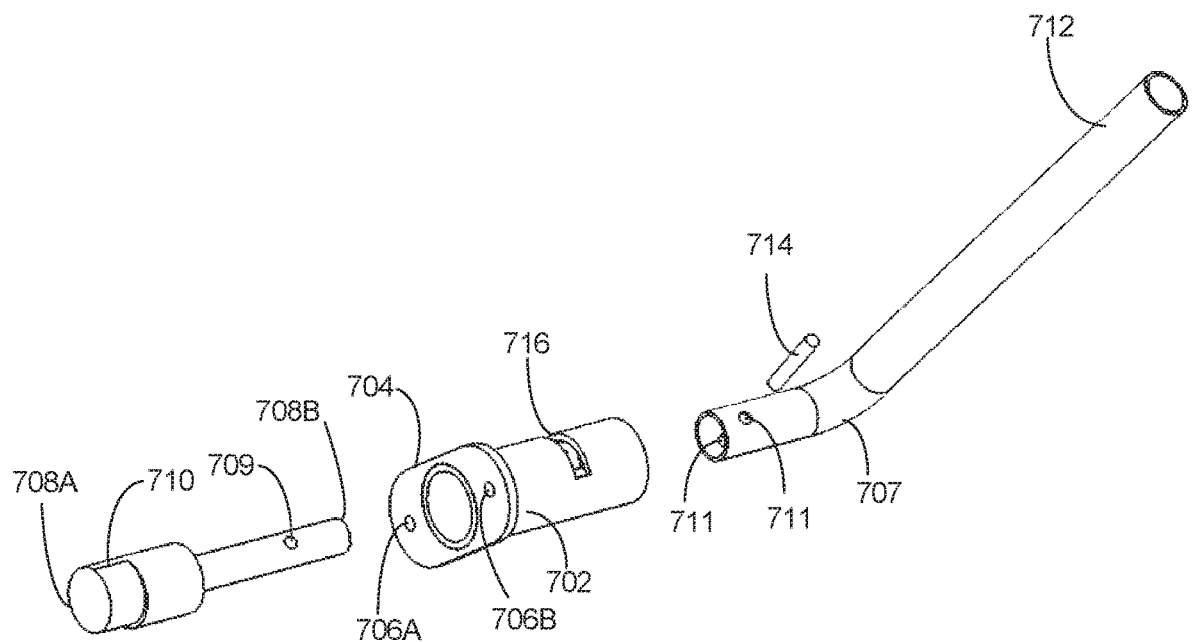
FIG. 7B is a perspective exploded view of the lock assembly, according to the embodiment of FIG. 7A.

In FIG. 6C, a cross-sectional view of the gooseneck coupler 600 in an unlatched position illustrates the gooseneck ball 610 within the coupler housing 602. In the unlatched position, the ball lock pin 606 is disengaged, so as to allow the gooseneck ball 610 to enter into the internal area of the coupler housing 602 from the lower opening.

Figure 6E:
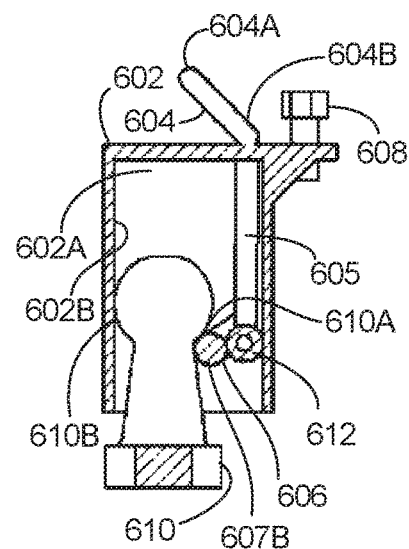
FIG. 6E is a section view of the gooseneck coupler connected to a gooseneck ball according to the embodiment of FIG. 6A in the locked position.

In FIG. 6E, the ball lock pin 606 is engaged and secures the gooseneck ball 610 within the interior of the coupler housing 602. In this embodiment, urging the release lever 604 in the direction of the housing 602 results in the downward movement of the linkage 605. The downward linkage 605 movement results in the corresponding displacement of a locking portion 612 to a position adjacent to the ball lock pin 606. The ball pin lock 606 is correspondingly urged from the open, or unlocked position at the first slot end 607A through the slot 606A to the second slot end 607B and against the lower profile of the ball 610A, thereby securing the opposite side 610B of the gooseneck ball 610 against the coupler housing inner wall 602B. In one example, upon securing a ball 610 within the coupler housing lumen 602A, a tightening bolt 608 can be turned to urge the push block 222 downward, thereby tightening and applying pressure through the base assembly 200 down to the truck bed 102, as would be appreciated by one of skill in the art.

FIGS. 7A-B are perspective views of the lock assembly 700, according to an exemplary embodiment. The lock assembly 700 generally comprises of an elongate, cylindrical outer lock tube 702 defining a first lock end 700A and second lock end 700B. A generally planar flange 704 comprising openings 706A, 706B configured to connect the lock assembly 700 to the roller guide plate 300 (as shown in FIG. 4D).

Continuing with FIGS. 7A-B, the generally cylindrical outer lock tube 702 can house an elongate lock pin 708, which extends substantially from the first lock pin end 708A to the second lock pin end 708B. The first lock pin end 708A has an offset region 710 that may be used to secure the rocker assembly 400 in a fixed position, as described below.

In certain embodiments, the second lock pin end 708B further comprises a lock joint 707 which is correspondingly attached to the lock handle 712 with a fastener 714, such as a pin, bolt, or other known attachment, which in certain embodiments is able to pass through the lock pin openings 709 and lock joint openings 711, as would be understood by one of skill in the art. As is shown in FIGS. 7A-B, in certain embodiments the lock handle 712 can be an elongate cylinder disposed at an angle from the axis defined by the first lock end 700A and second lock end 700B. As shown in FIGS. 7A-B, in this embodiment, the fastener 714 travels through a slot or opening 716 in the outer lock tube 702 so as to couple the lock handle 712 and to control or limit the motion of the lock pin 708 and lock handle 712.

Continuing with FIGS. 7A-B, the lock handle 712 can be maneuvered as guided by the slot or opening 716 in the outer lock tube 702. Accordingly, the rocker assembly 400 can be disengaged by urging the lock handle 712 outward, relative to the rocker assembly 400 by urging the lock pin 708 from of the corresponding lock pin opening 426A in the rocker plate 402 (as shown in FIG. 1B). In these embodiments, as the rocker assembly 400 moves, the lock pin 708 and lock handle 712 can be aligned to re-engage the lock opening 426. Upon alignment, the first lock pin end 708A and offset region 710 communicate with the lock opening 426 to secure the position of the rocker assembly 400.

In this embodiment, the lock handle 712 can then be rotated within the lock opening 426, thereby shifting the position of the offset region 710 of the lock pin 708 so as to increase the relative diameter of the lock pin 708 relative to the opening 426. As would be apparent to one of skill in the art, this slight position shift tightens the rocker assembly 400 to the roller guide plate 300, as the movement of the offset region 710 within the opening 426 urges the lock pin 708 against the opening, so as to create a snug connection. This urging of the opening results in a slight change in position of the rocker plate 402 to seat or apply pressure to the various projections 424 and against the ends 332 of the guide journals 330 of the roller guide plate 300.

Figure 8A:
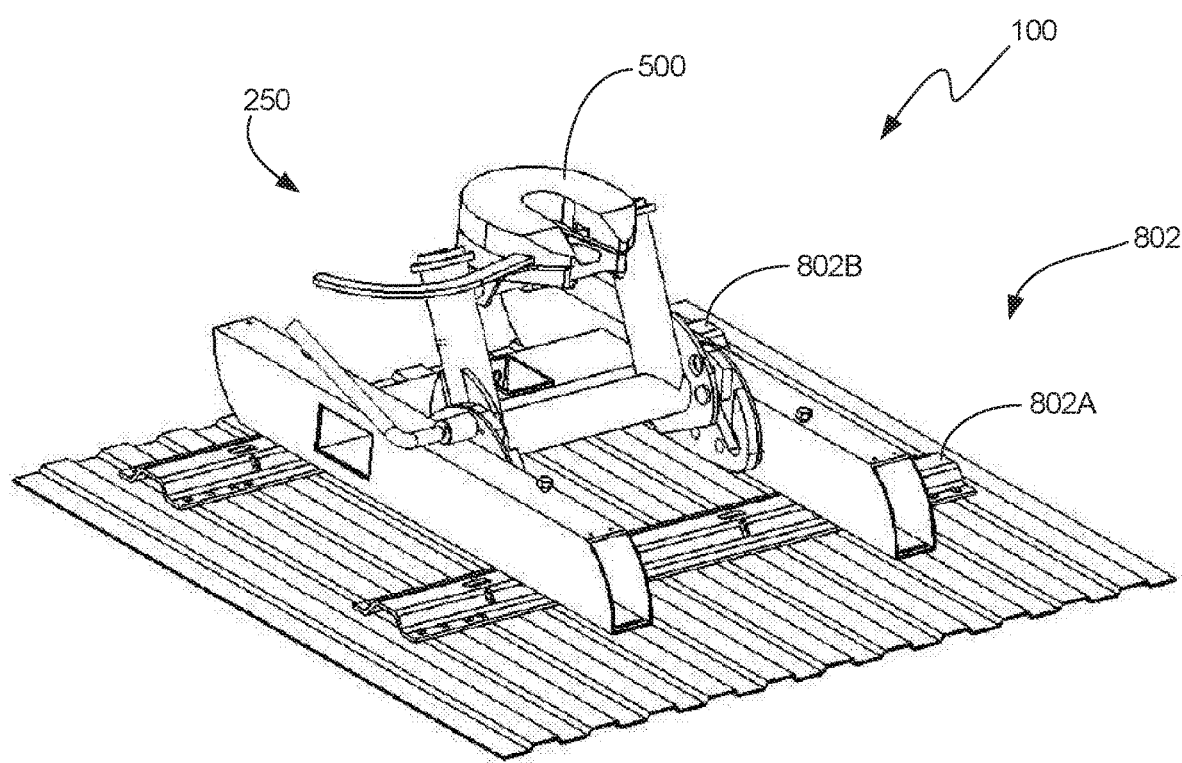
FIG. 8A is a perspective view of an alternate embodiment of the hitch comprising a rail kit adaptor.
Figure 8B:
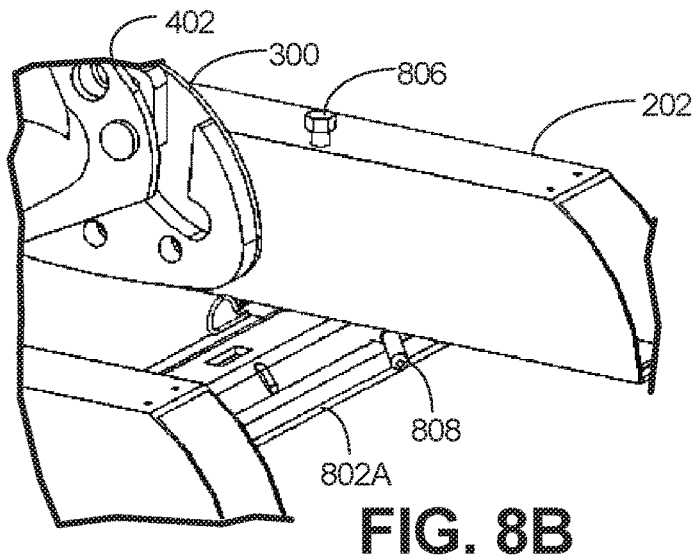
FIG. 8B is a close-up perspective view of the rail kit adapter according to the embodiment of FIG. 8A.
Figure 8C:
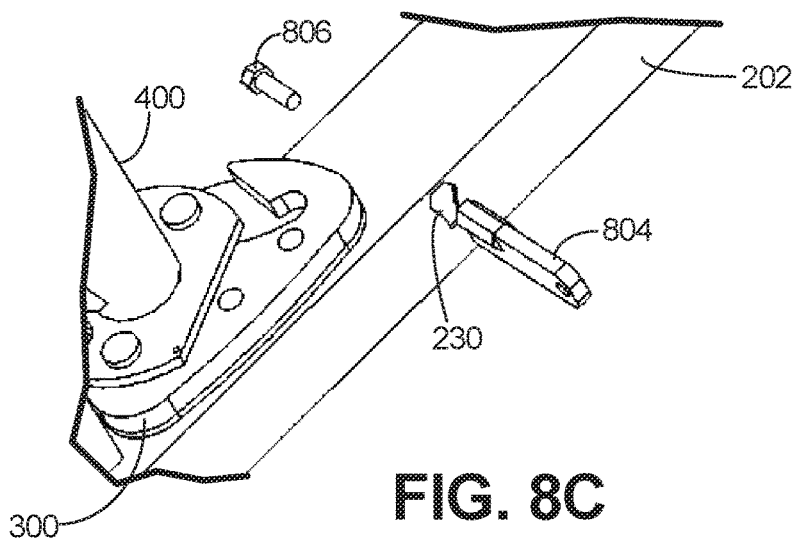
FIG. 8C is an exploded perspective view of the rail kit adapter according to the embodiment of FIG. 8A.

FIG. 8A is an alternate embodiment of the fifth wheel hitch assembly 100. In this embodiment, the base assembly 200 of the hitch 100 is attached to a standard fifth wheel rail kit 802A, 802B by rail kit adapters 804, as shown in FIG. 8C.

In these embodiments, each rail kit adapter 804 is inserted through the adapter opening 230 one side of the base assembly leg 202. A fastener 806, such as a bolt or screw, may be inserted into the opposite side of the base assembly leg 202 and threaded into the rail kit adapter 804. The base assembly 200 is positioned on top contour of the rail kit 802, and the lower portion of the rail kit adapters 804 protrude through receiving slots on the top contour of the rail kit 802. One or more pins 808 are inserted through the rail 802A, 802B and through the lower portion of the rail kit adapters 804 depicted in FIG. 8B. These embodiments thereby provide a tightening system, wherein one or more fasteners 806 can be quickly and easily tightened to secure the hitch to the rail kit 802, thereby eliminating any movement between the hitch 100 or base assembly 200 and the rail kit 802.

Figure 8D:
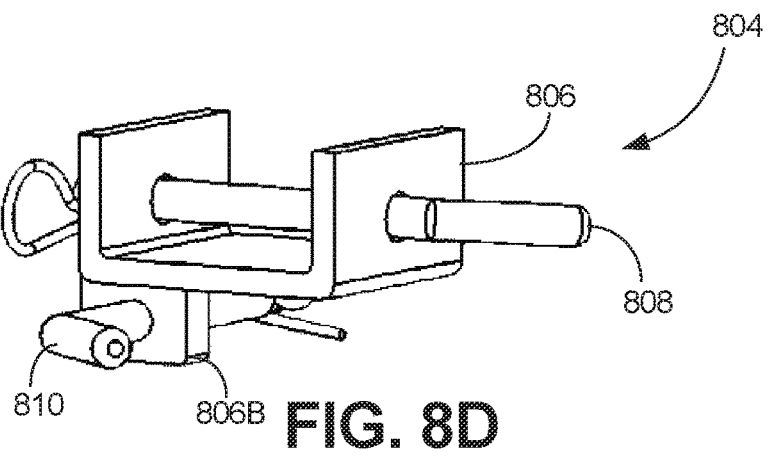
FIG. 8D is a perspective view of an alternate embodiment of the rail kit adapter.

FIG. 8D shows an alternate embodiment of the rail kit adapter 804. In this embodiment, a saddle 806 is provided with a fixed downward protrusion 806B. The saddle 806 further comprises a first fastener 808. The downward protrusion 806B is configured to be positioned through the top receiving slots of the rail 802 and secured in place with a second fastener 810, such as a pin and clip. The base assembly leg 202 is subsequently placed within the saddle 806 and effectively pinned though the leg 202 of the base assembly 200 with the first fastener 808.

Although the disclosure has been described with reference to preferred embodiments, persons skilled in the art will recognize that changes may be made in form and detail without departing from the spirit and scope of the disclosed apparatus, systems and methods.

The invention claimed is:

1. A trailer hitch for receiving a king pin having a base assembly, comprising:
   a) at least one support arm defining an internal cavity;
   b) an upper cushioned spring disposed within the internal cavity;
   c) a lower cushioned spring disposed within the internal cavity opposite the upper cushioned spring;
   d) an elongate support bar;
   e) a head assembly for receiving the king pin of a trailer; and
   f) a slide pivoting system,
   wherein
   i) the support bar and head assembly are supported via the at least one support arm between the upper and lower cushioned springs;

ii) the slide-pivoting system is releasably connected to the base assembly; and iii) the head assembly is releasably connected to the slide-pivoting system.

2. The hitch of claim 1, wherein the at least one support arm is oriented substantially vertically.

3. The hitch of claim 1, wherein the at least one support arm is cylindrical.

4. The hitch of claim 1, wherein the upper and lower cushioned springs are constructed and arranged to provide cushioned support.

5. The hitch of claim 1, wherein the at least one support arm is oriented at an angular position relative to the fore and aft of the hitch assembly.

6. The hitch of claim 1, wherein the head assembly comprises a plastic upper portion and a lower portion defining at least one pocket.

7. A trailer hitch for receiving a king pin, comprising:
a) a modular structure comprising:
i) a base assembly;
ii) a slide-pivoting system;
iii) a head assembly; and
iv) a first support arm comprising a first support bar upper cushioned spring and a first support bar lower cushioned spring,
wherein:
i) the slide-pivoting system is releasably connected to the base assembly; and
ii) the head assembly is releasably connected to the slide-pivoting system.

8. The hitch of claim 7, comprising at least one roller guide plate comprising open journal slots, wherein the slide-pivoting system releasably couples with the base assembly via the open journal slots.

9. The hitch of claim 7, comprising at least one rocker plate, wherein the slide-pivoting system releasably couples with the base assembly via the rocker plate.

10. The hitch of claim 7, comprising a selectively releasable gooseneck coupler comprising a fastener.

11. The hitch of claim 7, wherein the head assembly is in operational communication with the base assembly by way of the slide-pivoting system via at least one roller guide plate and at least on one rocker plate so as to be capable of pivoting and fixed positions.

12. The hitch of claim 7, further comprising a second support arm comprising a second support bar upper cushioned spring and a second support bar lower cushioned spring.

13. The hitch of claim 12, further comprising a support bar, wherein the first and second upper cushioned springs and first and second lower cushioned springs are disposed about first and second ends of the support bar, respectively, and are configured to absorb vibrational forces.

14. The hitch of claim 12, wherein the head assembly is supported by the first and second upper cushioned springs and first and second lower cushioned springs.

15. The hitch of claim 7, wherein the head assembly comprises a plastic upper portion.

16. The hitch of claim 7, wherein the head assembly comprises a lower portion defining at least one pocket.

17. A trailer hitch, for receiving a king pin having a base assembly, comprising:
a) a first support arm defining a first internal cavity;
b) a second support arm defining a second internal cavity;
c) a head assembly for receiving the king pin of a trailer; and
d) a slide-pivoting system,
wherein:
i) the first support arm comprises:
1) an upper cushioned spring disposed within the first internal cavity, and
2) a lower cushioned spring disposed within the first internal cavity;
ii) the second support arm comprises:
1) an upper cushioned spring disposed within the second internal cavity, and
2) a lower cushioned spring disposed within the second internal cavity;
iii) the slide-pivoting system is releasably connected to the base assembly; and
iv) the head assembly is releasably connected to the slide-pivoting system.

18. The hitch of claim 17, further comprising of a support bar suspended between the upper cushioned spring and the lower cushioned spring wherein the support bar spans the distance between the first support arm and second support arm.

* * * * *